(12) United States Patent
Tsai

(10) Patent No.: US 9,854,519 B2
(45) Date of Patent: Dec. 26, 2017

(54) HANDHELD DEVICE, BASE STATION AND TRANSMISSION CONTROL METHOD THEREOF

(71) Applicant: MEDIATEK INC., Hsinchu (TW)

(72) Inventor: Jeng-Yi Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 78 days.

(21) Appl. No.: 14/604,797

(22) Filed: Jan. 26, 2015

(65) Prior Publication Data

US 2015/0215869 A1 Jul. 30, 2015

Related U.S. Application Data

(60) Provisional application No. 61/932,326, filed on Jan. 28, 2014, provisional application No. 61/954,145, filed on Mar. 17, 2014.

(51) Int. Cl.
*H04W 52/02* (2009.01)
*H04L 5/00* (2006.01)
*H04W 72/04* (2009.01)

(52) U.S. Cl.
CPC ....... *H04W 52/0216* (2013.01); *H04L 5/0055* (2013.01); *H04W 52/0209* (2013.01); *H04W 72/0413* (2013.01); *H04W 72/0446* (2013.01); *Y02B 60/50* (2013.01)

(58) Field of Classification Search
CPC ........ H04L 5/0055; H04L 1/12–1/1896; H04L 5/0092; H04W 72/0413; H04W 52/0225; H04W 72/0446; H04W 52/0219; H04W 52/0216; H04W 52/0209; Y02B 60/50
See application file for complete search history.

(56) References Cited

U.S. PATENT DOCUMENTS

| | | | | |
|---|---|---|---|---|
| 7,551,589 B2* | 6/2009 | Kim | ........... | H04L 1/0003 370/326 |
| 7,554,953 B2* | 6/2009 | Baker | ........... | H04L 69/04 370/335 |
| 2005/0013263 A1* | 1/2005 | Kim | ........... | H04L 1/0068 370/320 |
| 2006/0221907 A1* | 10/2006 | Bachl | ........... | H04L 1/0041 370/335 |

(Continued)

FOREIGN PATENT DOCUMENTS

WO WO 2006/006895 * 1/2016 ............. H04B 7/005

OTHER PUBLICATIONS

NSN, "Compression and dynamic repetition of enhanced R99 voice services", 4GPP TSG-RAN WG1 Meeting #74-BIS, R1-134746, 7 pages.*

(Continued)

*Primary Examiner* — Edan Orgad
*Assistant Examiner* — Ivan O Latorre
(74) *Attorney, Agent, or Firm* — McClure, Qualey & Rodack, LLP

(57) ABSTRACT

A handheld device, a base station and transmission control methods thereof are provided. The handheld device transmits an uplink signal to the base station. The uplink signal comprises an uplink dedicated physical data channel (UL DPDCH) carrying data information in the first half of the non-transmission gap (non-TG) data slots and a corresponding uplink dedicated physical control channel (UL DPCCH) carrying control information according to a transmission mode.

24 Claims, 17 Drawing Sheets

(56) References Cited

U.S. PATENT DOCUMENTS

| | | | |
|---|---|---|---|
| 2013/0329701 A1* | 12/2013 | Bajzec | H04L 1/1887 370/336 |
| 2013/0343273 A1* | 12/2013 | Barbieri | H04L 1/1822 370/328 |
| 2014/0169273 A1* | 6/2014 | Chizgi | H04L 1/0039 370/328 |
| 2015/0030005 A1* | 1/2015 | Sambhwani | H04W 52/325 370/335 |
| 2015/0043487 A1* | 2/2015 | Akkarakaran | H04L 27/2602 370/329 |
| 2015/0049690 A1* | 2/2015 | Sambhwani | H04L 1/0053 370/329 |
| 2015/0131466 A1* | 5/2015 | Razaghi | H04W 24/08 370/252 |
| 2015/0223237 A1* | 8/2015 | Sambhwani | H04L 1/08 370/336 |
| 2015/0358135 A1* | 12/2015 | Wang | H03M 13/6525 370/336 |
| 2016/0029308 A1* | 1/2016 | Wu | H04W 16/10 370/311 |

OTHER PUBLICATIONS

ZTE: "uplink ACK channel design for DL FET", 3GPP Draft; R1-135619_UPLINK ACK Indication for DL FET, 3rd Generation Partnership Project (3GPP), Mobile Competence Centre; 650, Route Des Lucioles; F-06921 Sophia-Antipolis Cedex; France; Nov. 11-15, 2013.

ZTE: "Transmission of TFCI Information in Uplink", 3GPP Draft; R1-134667 TFCI Transmission in Uplink, 3rd Generation Partnership Project (3GPP), Mobile Competence Centre ; 650, Route Des Lucioles; F-06921 Sophia-Antipolis Cedex; France; Sep. 27, 2013.

"3rd Generation Partnership Project; Technical Specification Group Radio Access Network; Study on Dedicated Channel (DCH) enhancements for UMTS (Release 12)"; 3GPP Draft; 25702-C10, 3rd Generation Partnership Project (3GPP), Mobile Competence Centre ; 650, Route Des Lucioles ; F-06921 Sophia-Antipolis Cedex;France; Dec. 12, 2013.

Extended European Search Report for corresponding European Patent application No. 15152487.3 rendered on Jun. 12, 2015.

* cited by examiner

HANDHELD DEVICE, BASE STATION AND TRANSMISSION CONTROL METHOD THEREOF

CROSS-REFERENCES TO RELATED APPLICATIONS

The present application claims the priority benefit of U.S. provisional application Ser. Nos. 61/932,326, filed Jan. 28, 2014 and 61/954,145, filed Mar. 17, 2014. The contents of both of these provisional applications are incorporated herein by reference.

BACKGROUND OF THE INVENTION

Field of the Invention

The present invention relates to a handheld device, a base station and transmission control methods thereof. More particularly, the handheld device of the present invention transmits an uplink signal with an uplink dedicated physical data channel (UL DPDCH) in which only first 15 non-transmission gap (non-TG) data slots within two radio frames carry user data.

Descriptions of the Related Art

With the development of wireless communication technologies, wireless devices have been widely used. To satisfy users' demand for speech service, various telecommunication standards have been developed. Universal mobile telecommunications system frequency division duplex (UMTS-FDD) Release 99 is a version of the third generation (3G) communication system. The UMTS-FDD Release 99 provides circuit-switched speech service in which a circuit-switched connection is established between a user device and a base station. User data and physical layer control information are carried on dedicated physical channels (DPCHs) of the uplink signal and the downlink signal, and the uplink signal and the downlink signal are respectively transmitted in different frequency bands at the same time.

FIG. 1A is a schematic diagram of the uplink signal in a radio frame with 15 slots as defined in the UMTS-FDD Release 99 specification. The DPCH of the uplink signal includes a dedicated physical data channel (DPDCH) carrying user data and a dedicated physical control channel (DPCCH) carrying physical layer control information. In each slot, the DPCCH comprises a pilot field, a transport format combination indication (TFCI) field, a feedback indication (FBI) field and a transmit power control (TPC) field. In addition, the minimum transmission time interval (minimum TTI) defined in the UMTS-FDD Release 99 specification may be one, two or four radio frames. In the case that the minimum TTI is two or four radio frames, first 30 bits of the TFCI code word are repeatedly carried in each radio frame in the minimum TTI. For example, FIG. 1B depicts the repeated TFCI code word when the minimum TTI is two radio frames.

However, power saving is a critical issue for the user device. Accordingly, an urgent need exists in the art to provide a transmission mechanism for reducing the power consumption in the user device.

SUMMARY OF THE INVENTION

The objective of the present invention is to provide a transmission control mechanism for circuit-switched speech services in which the minimum TTI is two radio frames. By the transmission control mechanism of the present invention, the user device only use the first 15 non-transmission gap (non-TG) data slots within two radio frames of UL DPDCH to carry user data. Therefore, the present invention can reduce the power consumption in the user device in such a case that a downlink data frame is successfully and early decoded or the base station also use the first 15 non-transmission gap (non-TG) data slots within two radio frames of DL DPDCH to carry the downlink data.

To achieve the aforesaid objective, the present invention discloses a handheld device which comprises a processor and a transceiver. The processor is configured to generate an uplink signal according to a transmission type. The transceiver is electrically connected to the processor and configured to transmit the uplink signal to a base station. The uplink signal comprises an uplink dedicated physical data channel (UL DPDCH) having 15 non-transmission gap (non-TG) data slots within two radio frames to carry user data.

In addition, the present invention further discloses a transmission control method for use in a handheld device. The handheld device comprises a processor and a transceiver. The transceiver is electrically connected to the processor. The transmission control method comprises the following steps:

(a) generating, by the processor, an uplink signal according to a transmission mode, wherein the uplink signal comprises an uplink dedicated physical data channel (UL DPDCH) having 15 non-transmission gap (non-TG) data slots within two radio frames to carry user data; and (b) transmitting, by the transceiver, the uplink signal to a base station.

Besides, in order to achieve the aforesaid objective, the present invention further discloses a base station which comprises a transceiver and a processor. The transceiver is configured to receive an uplink signal from a handheld device. The uplink signal comprises an uplink dedicated physical data channel (UL DPDCH) having 15 non-transmission gap (non-TG) data slots within two radio frames to carry user data. The processor is electrically connected to the transceiver and configured to retrieve the user data from the 15 non-transmission gap (non-TG) data slots.

Moreover, the present invention further discloses a transmission control method for use in a base station. The base station comprises a transceiver and a processor. The processor is electrically connected to the transceiver. The transmission control method comprises the following steps:

(a) receiving, by the transceiver, an uplink signal transmitted from a handheld device, wherein the uplink signal comprises an uplink dedicated physical data channel (UL DPDCH) having 15 non-transmission gap (non-TG) data slots within two radio frames to carry user data; and (b) retrieving, by the processor, the user data from the 15 non-transmission gap (non-TG) data slots.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a handheld device, a base station and transmission control methods thereof. In the following description, the present invention will be explained with reference to embodiments thereof. It shall be appreciated that, theses embodiments of the present invention are not intended to limit the present invention to any specific environment, applications or implementations described in these embodiments. Therefore, the description of these embodiments is only for purpose of illustration rather than to limit the present invention and the scope claimed in this application shall be governed by the claims. Additionally, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
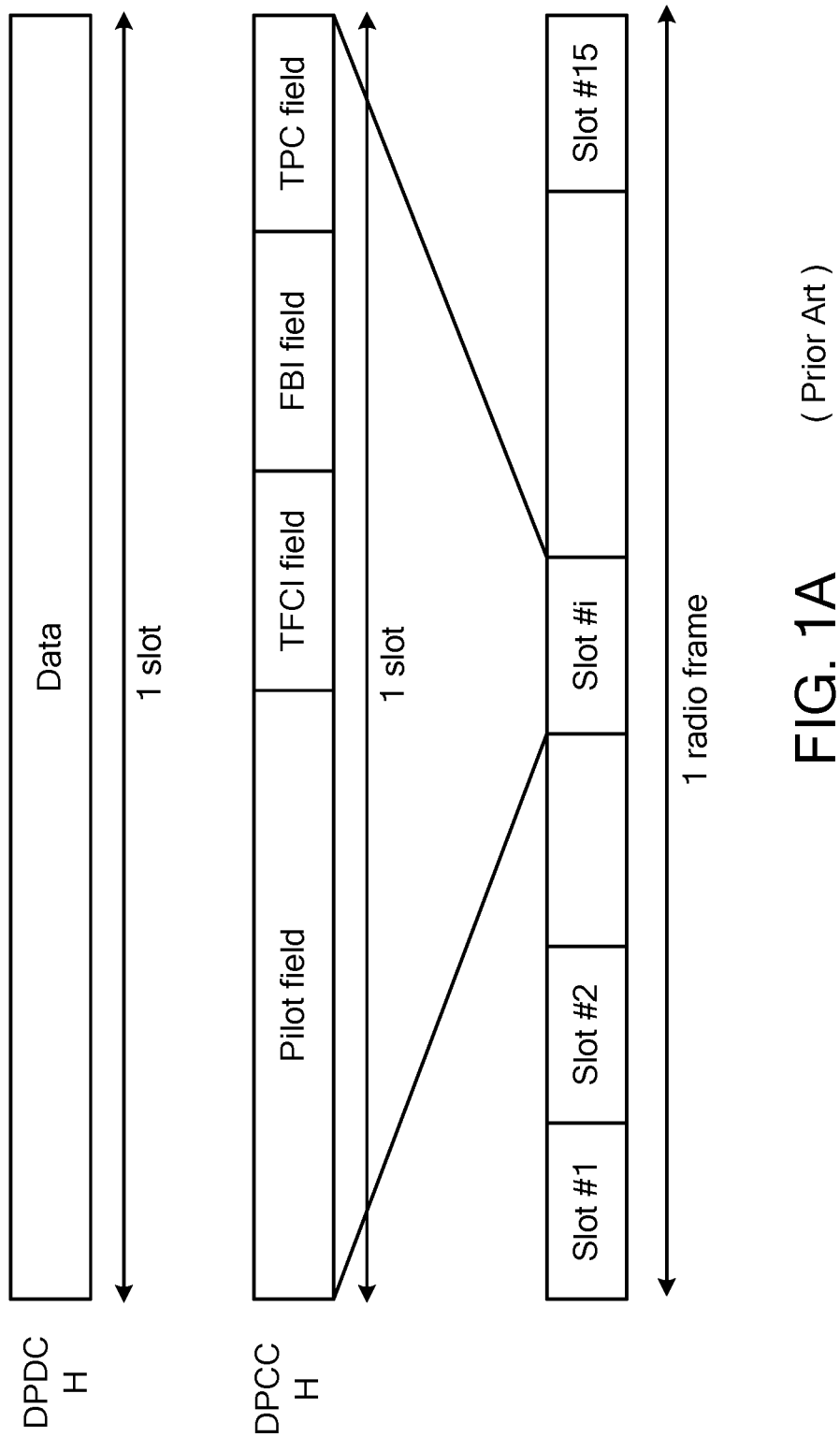
FIG. 1A is a schematic diagram of the uplink signal with 15 slots over a radio frame in accordance with the present UMTS-FDD Release 99 specification.
Figure 1B:
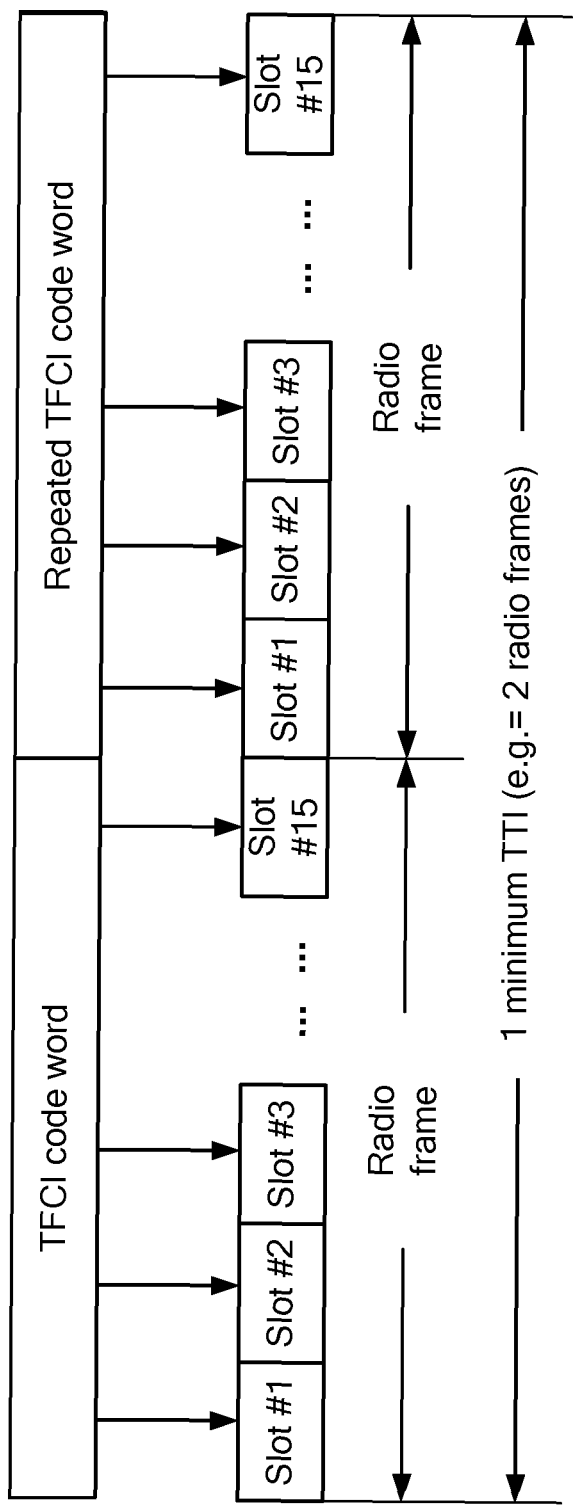
FIG. 1B is a schematic diagram showing the repeated TFCI code word in the case that the minimum TTI is two radio frames
Figure 2:
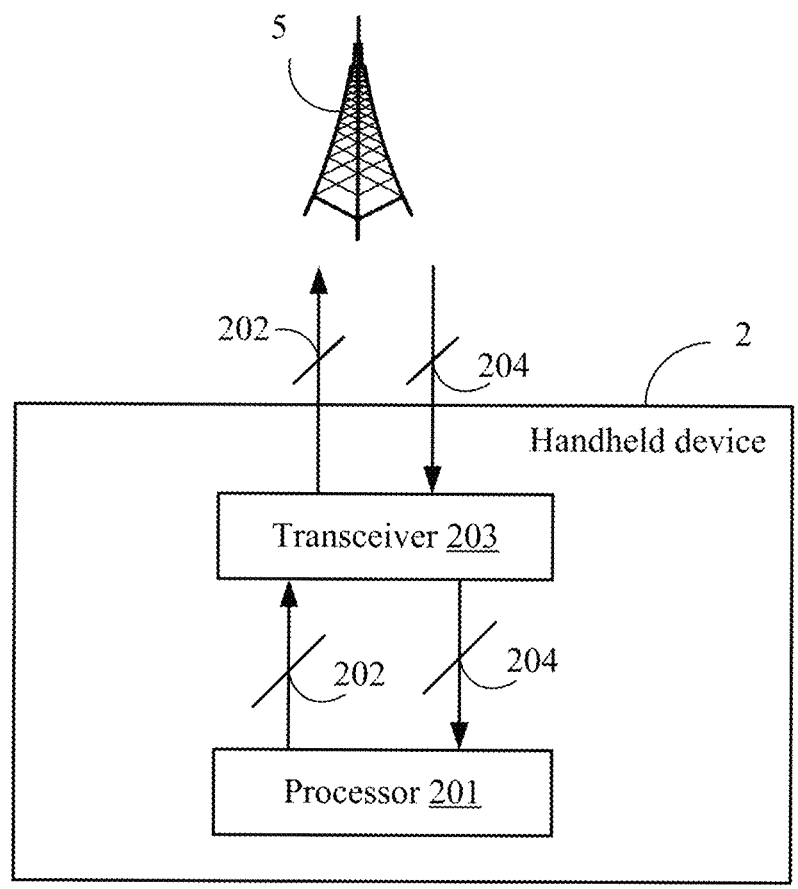
FIG. 2 is a schematic view of a handheld device 2 according to the first embodiment to the fourth embodiment of the present invention.

The first embodiment of the present invention is depicted in FIG. 2, which is a schematic diagram of a handheld device 2. The handheld device 2 communicates with a base station 5. The handheld device 2 may be a smart phone, a tablet computer, or any other device with communication capability. It shall be noted that for the purpose of simplicity, other elements of the handheld device 2, such as a display module, an antenna module, a power module and elements less related to the present invention, are all omitted from depiction herein.

Figure 3A:
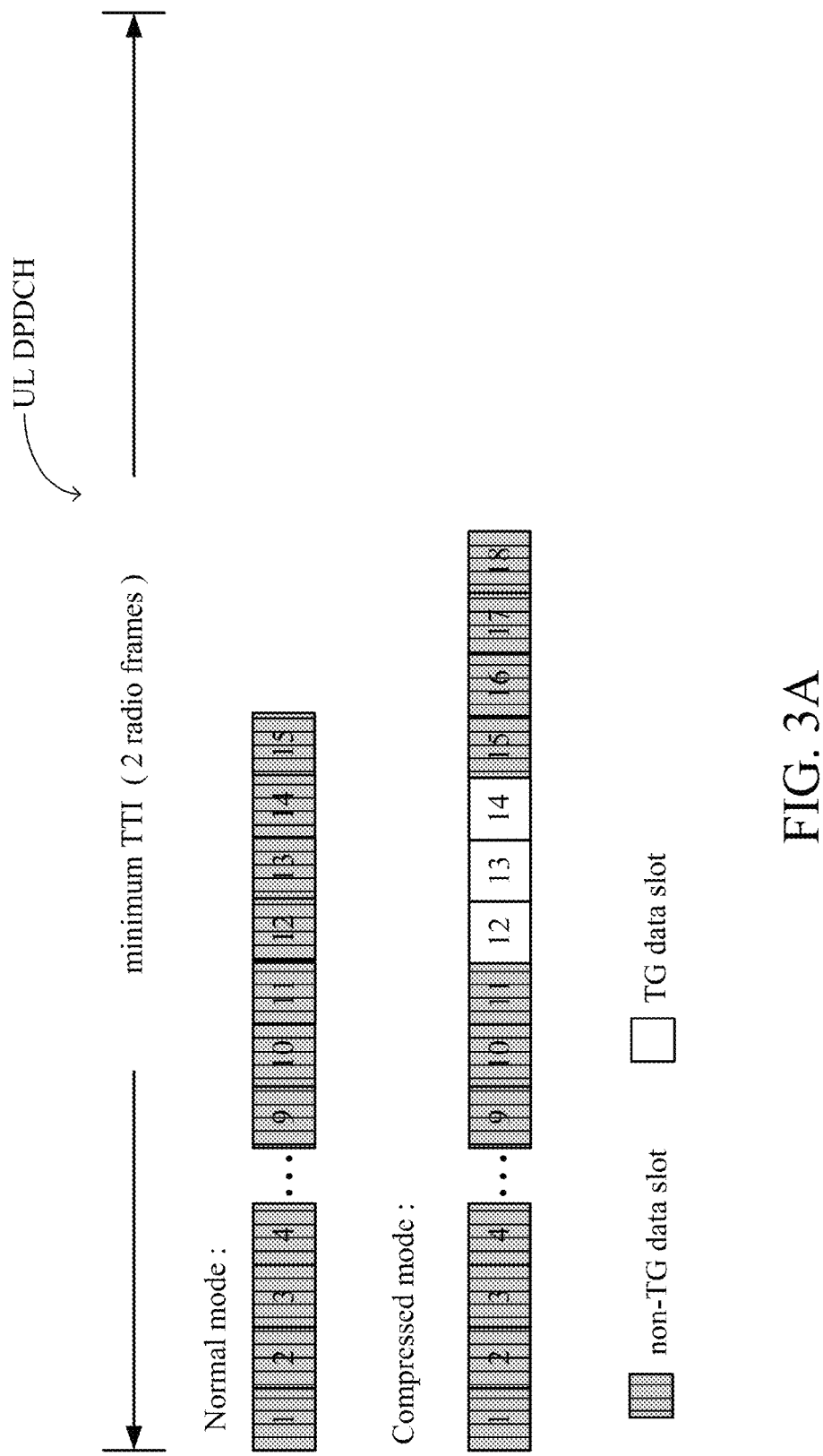
FIGS. 3A-3B respectively depict different structures of the uplink dedicated physical data channel (UL DPDCH) of two transmission types in the normal mode and the compressed mode according to the first embodiment of the present invention.

The handheld device 2 comprises a processor 201 and a transceiver 203. The transceiver 203 is electronically connected to the processor 201. When the handheld device 2 communicates with the base station 5, the processor 201 generates an uplink signal 202 according to a transmission type (hereinafter called the first transmission type). The transceiver 203 transmits the uplink signal 202 to the base station 5 and receives a downlink signal 204 from the base station 5 simultaneously. The uplink signal 202 comprises an uplink dedicated physical data channel (UL DPDCH). In the first transmission type, the UL DPDCH has only 15 non-transmission gap (non-TG) data slots within two radio frames to carry user data. FIG. 3A shows the UL DPDCH structures according to the first transmission type of the present invention in both of the normal mode and the compressed mode defined in the UMTS-FDD Release 99 specification. It is noted that each of the data slots or the control slots herein are respectively designated by Slot #1 to Slot #30 within 2 radio frames. Since every data slot is a non-TG data slot in normal mode, the first 15 data slots of the UL DPDCH of the uplink signal 202 within a minimum TTI (e.g. two radio frames) carry user data.

Compared to the normal mode, the compressed mode has a period of time corresponding to some TG data slots within a minimum TTI and the period of time is used for measurement purpose. In this case, the user data are only carried by the non-TG data slots. For example, in the case that there are three TG data slots within the first 15 data slots (i.e., Slot #12 to Slot #14) in the compressed mode, the UL DPDCH of the uplink signal 202 carries user data in the first 15 non-TG data slot (i.e., Slot #1 to Slot #11 and Slot #15 to Slot #18).

Figure 3B:

FIG. 3B shows another transmission type (hereinafter called the second transmission type) of the present invention in both the normal mode and compressed mode. The structure of the UL DPDCH in the second transmission type is the same structure with 20 ms TTI as defined in the UMTS-FDD Release 99. Unlike the first transmission type of the present invention, all non-TG data slots within the two radio frames of the UL DPDCH are used for carrying user data as shown in FIG. 3B. Specifically, in the normal mode (no TG data slot), all 30 data slots within two radio frames are used for carrying user data. And, in compressed mode, only non-TG data slots within two radio frame are used for carrying user data. For example, in the case there are three TG data slots (i.e. Slot #11 to Slot #13) within the two radio frames, the user data are carried in the 27 non-TG data slots excluding Slot #11 to Slot #13.

The following description will focus on the configuration of the first transmission type of the present invention. In detail, a spreading factor applied to the UL DPDCH according to the first transmission type may be determined by Equation 1:

$$SF = \frac{2560}{N_{data}}, \quad \text{(Equation 1)}$$

where $N_{data}$ is a number of data bits carried in a single non-TG data slot of the first 15 non-TG data slots and SF is the spreading factor applied to the UL DPDCH. It can be appreciated that in the first transmission type, user data are only carried in the first 15 non-TG data slots within two radio frames. Thus, in the normal mode, the number of data bits carried in a single non-TG data slot of the first transmission type is double that of the second transmission type. This results in a smaller spreading factor applied to the UL DPDCH in the first transmission type compared to that applied to the UL DPDCH in the second transmission type.

Besides, a nominal power relation in the first transmission type of the present invention may be defined by Equation 2:

$$A_{jp} = \sqrt{2} \cdot A_j \quad \text{(Equation 2),}$$

where $A_{jp}$ is the nominal power relation in the first transmission type and $A_j$ is a nominal power relation in the UMTS-FDD Release 99 and the second transmission type. $A_j$ is defined by Equation 3:

$$A_j = \frac{\beta_d}{\beta_c}, \quad \text{(Equation 3)}$$

where $\beta_d$ is a gain factor of the UL DPDCH and $\beta_c$ is a gain factor of the UL DPCCH. Since the nominal power relation $A_j$ in the UMTS-FDD Release 99 has been well appreciated by a person having ordinary skill in this art, it will not be further described herein.

It should be appreciated that, during soft handover, each handheld device can communicate with more than one base station simultaneously with the same UL DPCH. In other words, the handheld device 2 can communicate not only with the base station 5 but also with other base station simultaneously with the same UL DPCH during soft handover.

Figure 4A:
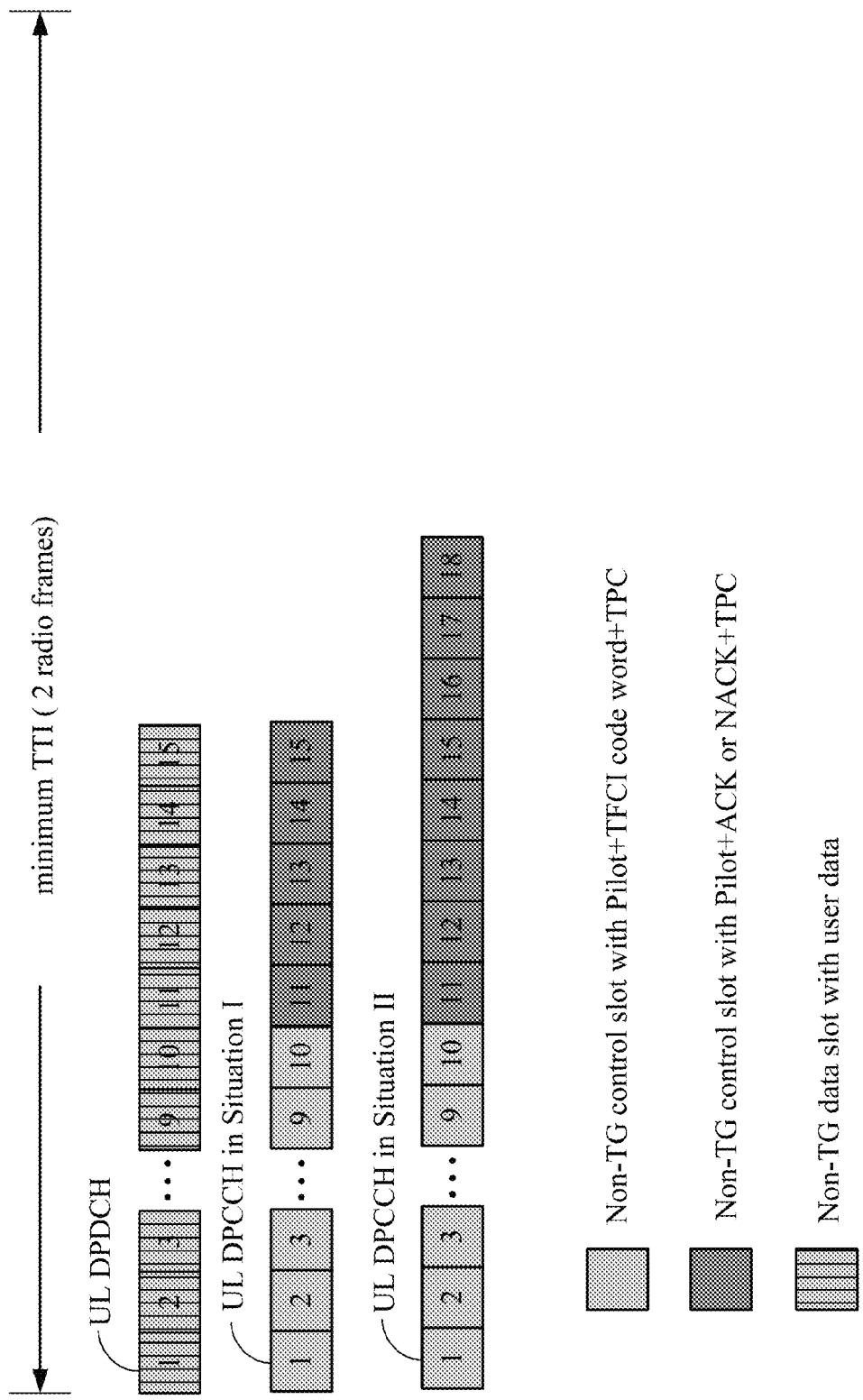
FIGS. 4A-4B respectively depict the UL DPDCH and the UL DPCCH of the uplink signal in the normal mode and the compressed mode according to the second embodiment of the present invention.
Figure 4B:
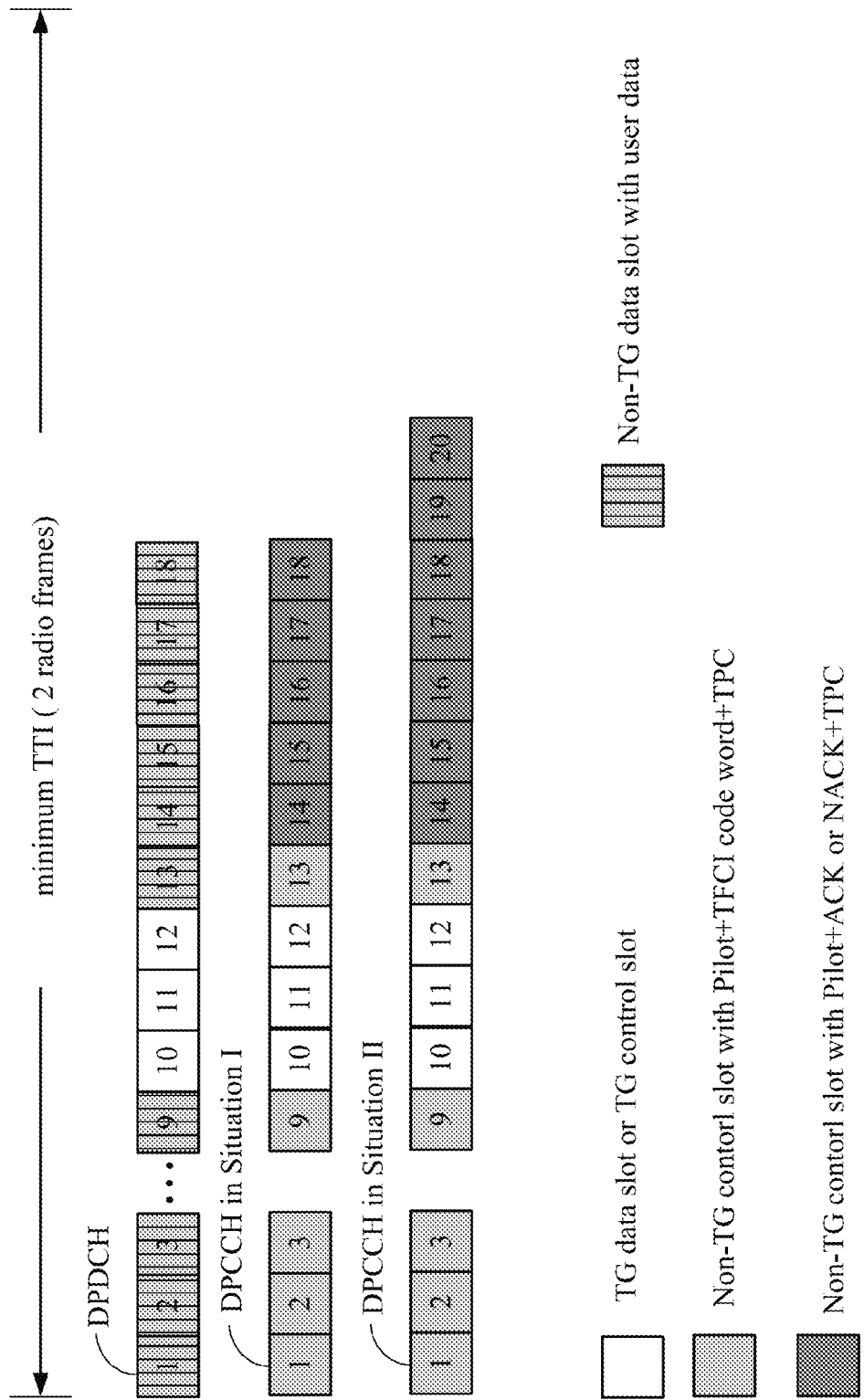

A second embodiment of the present invention is depicted in FIGS. 4A-4B. The uplink signal 202 of the present invention further comprises an uplink dedicated physical control channel (UL DPCCH). For example, FIG. 4A depicts the UL DPDCH and the UL DPCCH within the 2 radio frames in the normal mode. FIG. 4B depicts the UL DPDCH and the UL DPCCH within the 2 radio frames in the compressed mode.

As shown in FIGS. 4A and 4B, the UL DPCCH has at least 15 non-TG control slots within the 2 radio frames. Each of the at least 15 non-TG control slots has a transport format combination indicator (TFCI) field. The TFCI fields of first 10 non-TG control slots of the at least 15 non-TG control slots carry a TFCI code word, and the TFCI fields of remaining non-TG control slots of the at least 15 non-TG control slots carry acknowledgement (ACK) information for downlink data frame early termination. The ACK information comprises a plurality of 2-bit indications, each of which is carried in one of the remaining non-TG control slots and represents either an acknowledgement (ACK) indication or a negative-acknowledgment (NACK) indication.

In the present invention, each non-TG control slot has three fields which includes the pilot field, the transport format combination indicator (TFCI) field and the transmit power control (TPC) field, but excludes the FBI field. The TFCI field carries 2 bits, the pilot field carries 6 bits and the TPC field carries 2 bits. Since the present invention only focuses on the information carried in the TFCI field, the pilot field and the TPC field are not further described herein.

In the normal mode, the first 10 control slots within the two radio frames of the UL DPCCH carry the TFCI code word. Then, the processor 201 fills the ACK information from Slot #11, depending on whether the downlink data frame of the downlink signal 204 has been successfully decoded. The situation I in FIG. 4A shows that the downlink data frame of the downlink signal 204 has been successfully decoded before the time point of Slot #15, and thus the number of the used control slots are identical to that of the used data slots. On the other hand, the situation II in FIG. 4A shows that the downlink data frame of the downlink signal 204 may have been successfully decoded after the time point of Slot #15, and thus, the number of the used control slots are larger than that of the used data slots. In a word, the number of the used control slots depends on when the processor 201 has decoded the downlink data frame of the downlink signal 204 successfully.

Similarly, FIG. 4B shows there are three TG slots (e.g., Slot #10 to Slot #12) in the compressed mode. The first 10 non-TG control slots (i.e., Slot #1 to Slot #9 and Slot #13) within the two radio frames of UL DPCCH carry the TFCI code word. In the situation I of FIG. 4B, the downlink data frame of the downlink signal 204 has been successfully decoded before the time point of Slot #18, and thus the number of the used control slots are identical to that of the used data slots. In situation II of FIG. 4B, the downlink data frame of the downlink signal 204 may have been successfully decoded after the time point of Slot #18, and thus, the number of the used control slots are larger than that of the used data slots. As described earlier, the number of the used control slots depends on when the processor 201 has decoded the downlink data frame of the downlink signal 204 successfully.

It is note that the TFCI code word in the present invention is a truncated 20-bit TFCI code word from a 32-bit TFCI code word corresponding to a 10-bit TFCI information. For example, the 10-bit TFCI information may be encoded with the Reed-Muller code into the 32-bit TFCI code word, and then each TFCI field of the first 10 non-TG control slots carries 2 bits of the truncated 20-bit TFCI code.

Figure 5:
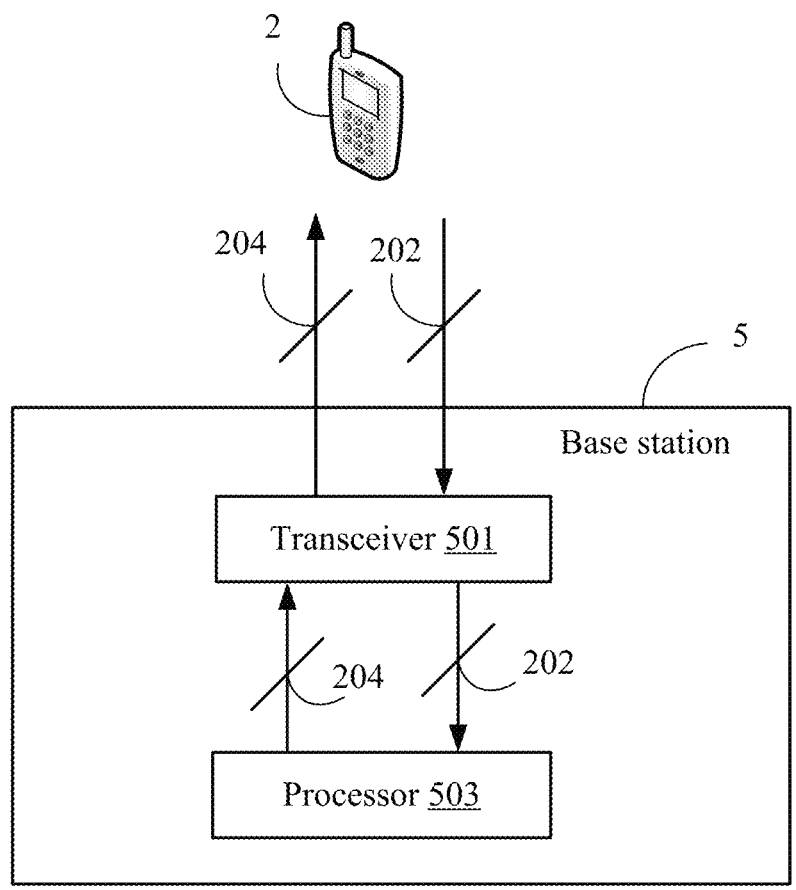
FIG. 5 is a schematic view of a base station 5 according to the third embodiment of the present invention.

A third embodiment of the present invention is depicted in FIG. 5, which is a schematic diagram of the base station 5. The base station 5 comprises a transceiver 501 and a processor 503. The transceiver 501 transmits the downlink signal 204 to the handheld device 2 and receives the uplink signal 202 from the handheld device 2. The processor 503 is electrically connected to the transceiver 501 and configured to retrieve the user data from the 15 non-TG data slots within every two radio frames of the UL DPDCH of the uplink signal 202, generate the downlink signal 204 and enable the transceiver 501 to terminate transmission of the downlink data frame of the downlink signal 204 according to the ACK information.

Figure 6A:
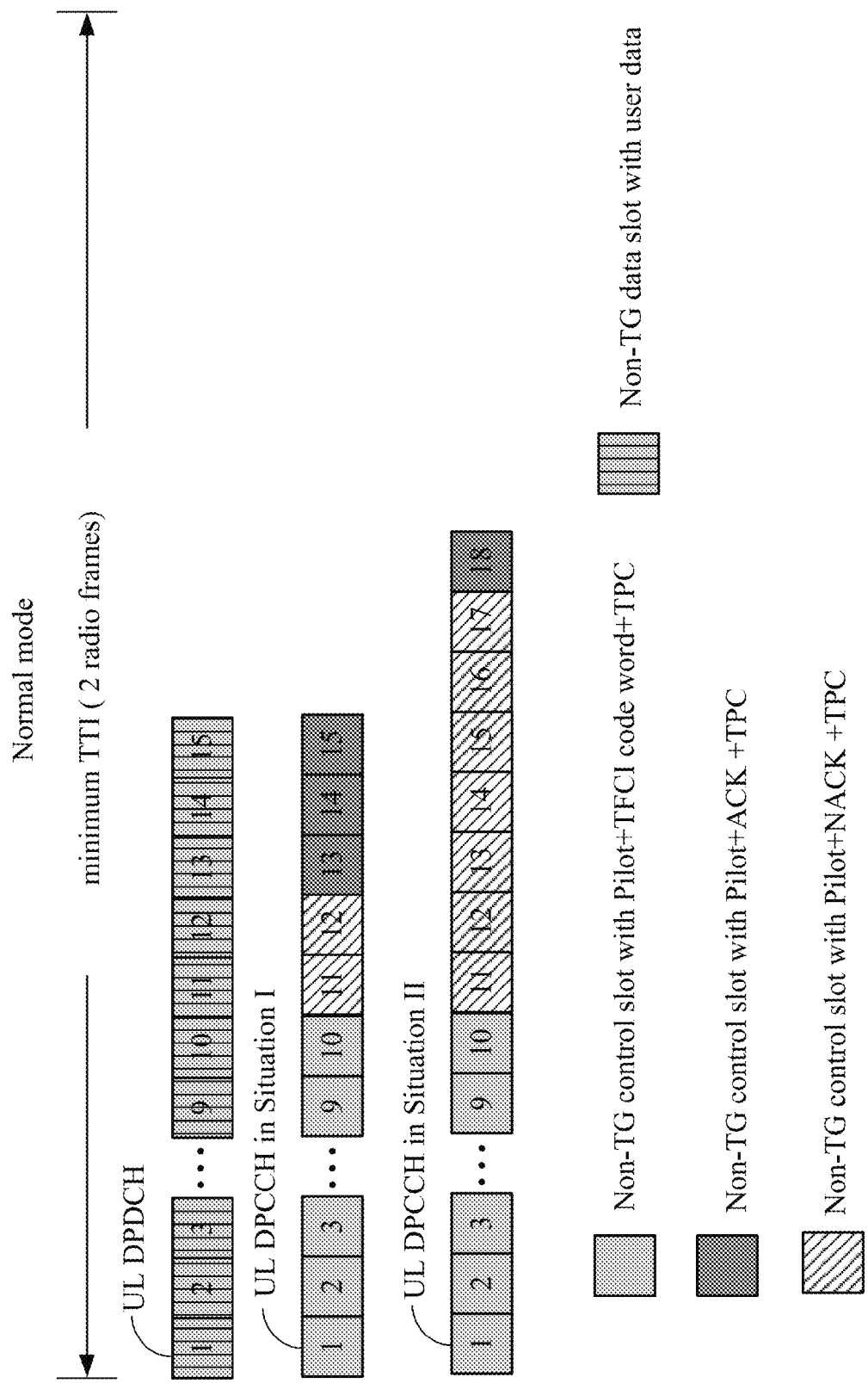
FIGS. 6A-6B respectively depict the UL DPDCH and the UL DPCCH of the uplink signal in the normal mode and the compressed mode according to the fourth embodiment of the present invention.
Figure 6B:
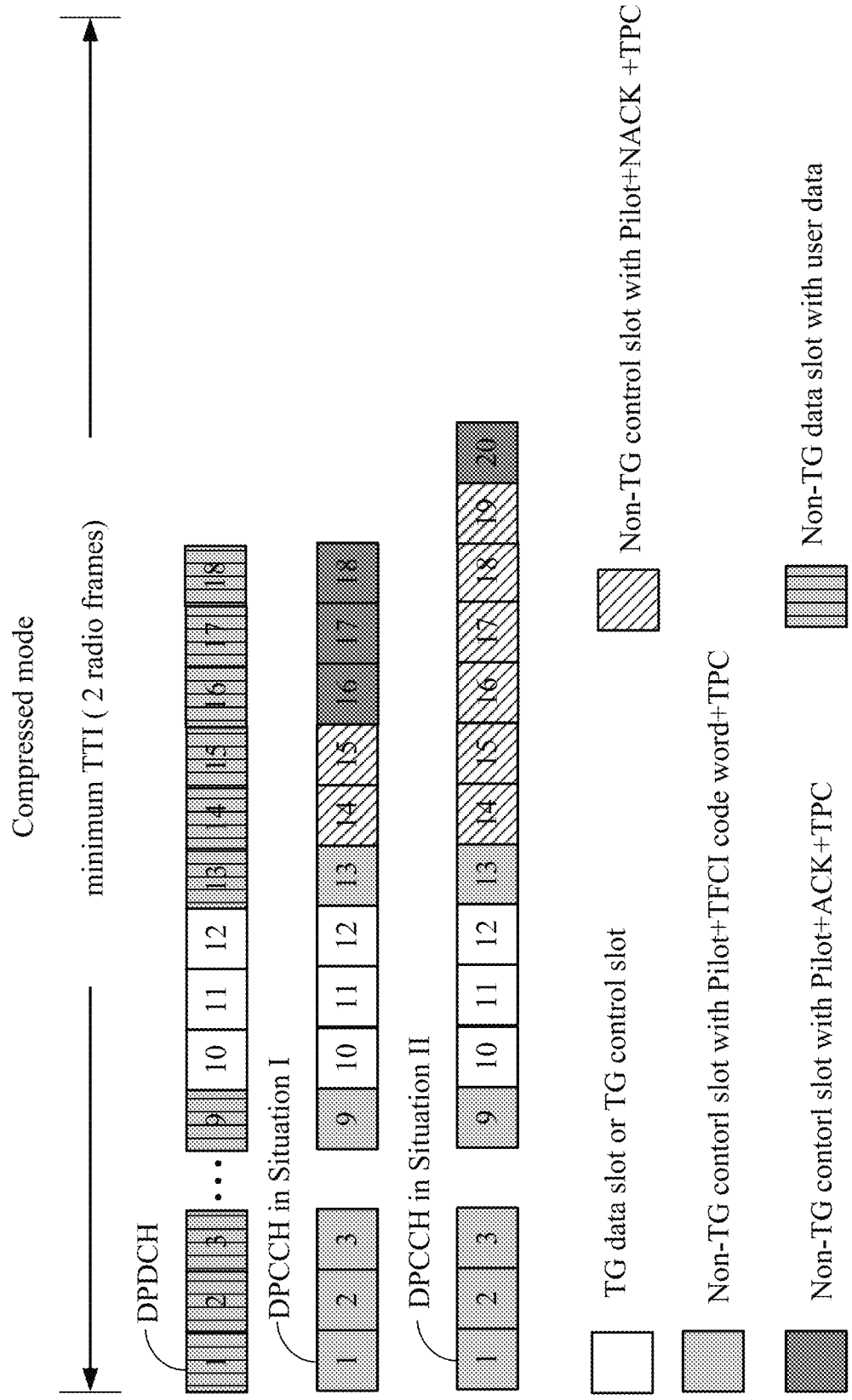

A fourth embodiment of the present invention is depicted in FIGS. 6A and 6B. As aforementioned, the TFCI fields of remaining non-TG control slots carry ACK information. In the present invention, the ACK information comprises a plurality of 2-bit indications. Each 2-bit indication is carried in the TFCI field of a non-TG control slot of the remaining non-TG control slots and may be an ACK indication or a negative-acknowledgment (NACK) indication based on whether the downlink data frame of the downlink signal 204 has been successfully decoded yet. In this embodiment, the processor 201 defines a single 2-bit indication (ACK indication or NACK indication) as an ACK command. Thus, each of the 2-bit indications carried in a single non-TG control slot of the remaining non-TG control slots constitutes an ACK command.

Specifically, the processor 201 fills the NACK indication into every non-TG control slot in which the downlink data frame of the downlink signal 204 has not been successfully decoded by the processor 201. By contrast, the processor 201 fills the ACK indication into every non-TG control slot in which the downlink data frame of the downlink signal 204 has been successfully decoded by the processor 201. For example, as shown in the situation I of FIG. 6A, the 2-bit NACK indications are carried in Slot #11 to Slot #12 and the 2-bit ACK indications are carried in Slot #13 to Slot #15 in normal mode. In this case, the downlink data frame of the downlink signal 204 has not been successfully decoded until the time point of Slot #13. In another example as shown in the situation II of FIG. 6A, the 2-bit NACK indications are carried in Slot #11 to Slot #17 and the 2-bit ACK indication is carried in Slot #18 in normal mode. In this case, the downlink data frame of the downlink signal 204 has not been successfully decoded until the time point of Slot #18.

FIG. 6B shows there are three TG slots (e.g., Slot #10 to Slot #12) in the compressed mode. In the situation I of FIG. 6B, the 2-bit NACK indications are carried in Slot #14 to Slot #15 and 2-bit ACK indications are carried in Slot #16 to Slot #18. In this case, the downlink data frame of the downlink signal 204 has not been successfully decoded until the time point of Slot #16. The situation II of FIG. 6B depicts that the 2-bit NACK indications are carried in Slot #14 to Slot #19 and the 2-bit ACK indication is carried in Slot #20. In this case, the downlink data frame of the downlink signal 204 has not been successfully decoded until the time point of Slot #20.

In other embodiments, the processor 201 may further boost a transmission power of the ACK indications so that the transmission power of the ACK indications is larger than that of the NACK indications. Due to the power enhancement in the ACK indications, the base station 5 is capable of more accurately detecting the ACK indications so that the base station 5 can terminate the transmission of the downlink data frame of the downlink signal 204 according to the ACK indications.

Figure 7A:
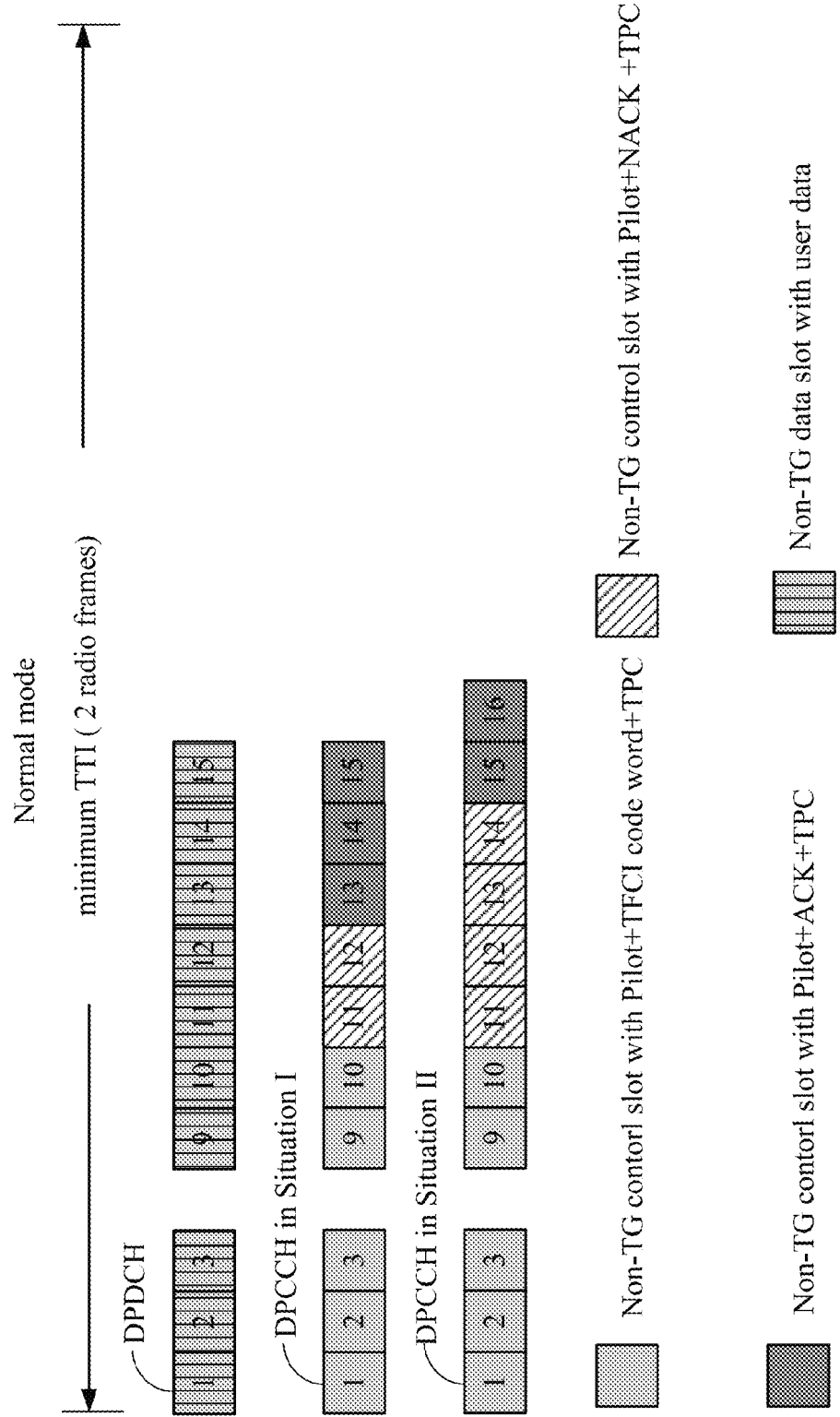
FIGS. 7A-7C respectively depict the UL DPDCH and the UL DPCCH of the uplink signal in the normal mode and the compressed mode according to the fifth embodiment of the present invention.
Figure 7B:
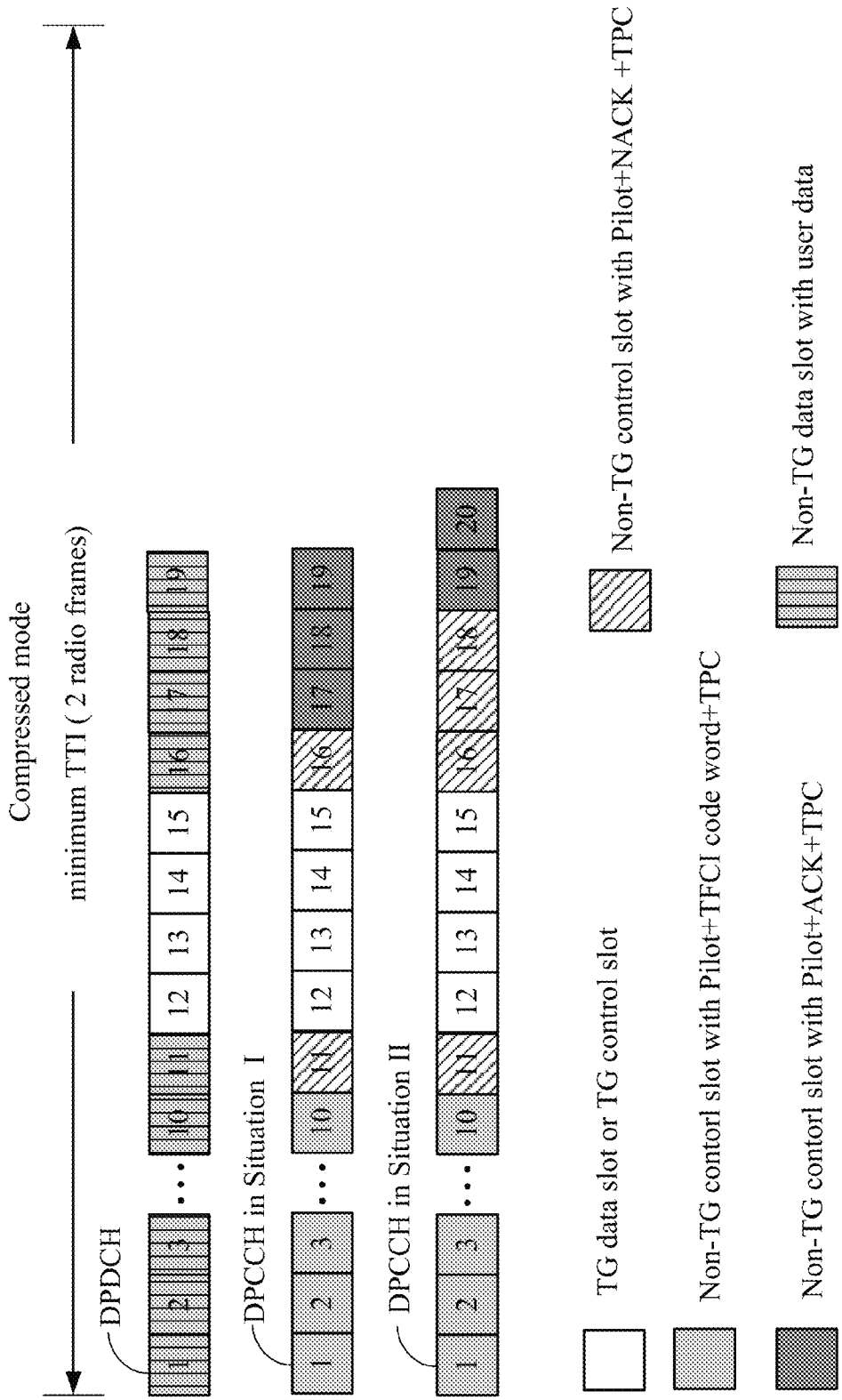
Figure 7C:
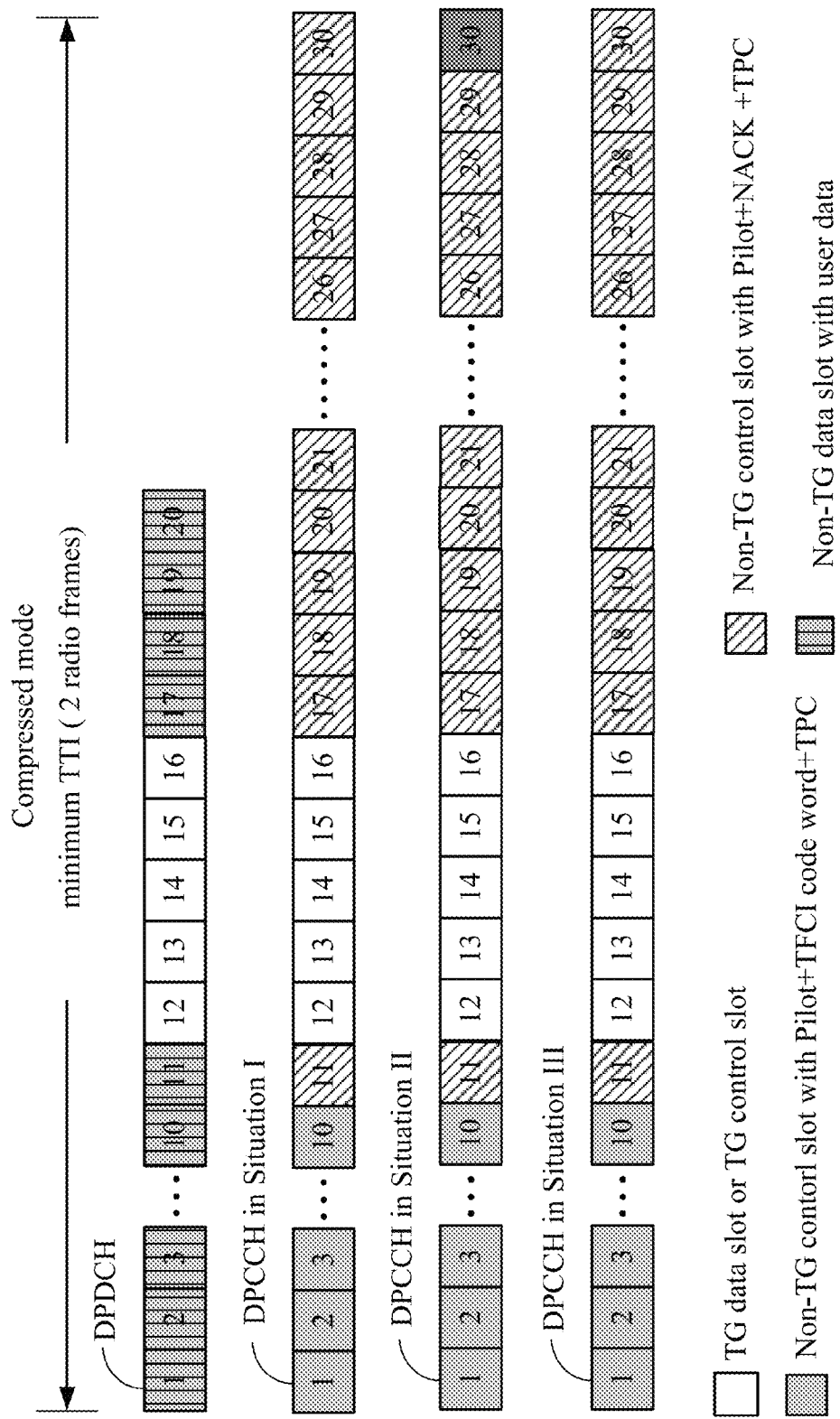

A fifth embodiment of the present invention is shown in FIGS. 7A, 7B and 7C. In this embodiment, the processor 201 defines two 2-bit indications (two ACK indications or two NACK indications) as an ACK command. Thus, every two of the 2-bit indications carried in two successive non-TG control slots of the remaining non-TG control slots constitutes an ACK command. Specifically, the processor 201 fills the NACK indications into the two successive non-TG control slots in which the downlink data frame of the downlink signal 204 has not been successfully decoded by the processor 201. Moreover, the processor 201 executes the following operations: (a) filling the ACK indications into the two successive non-TG control slots which correspond to two non-TG data slots of the 15 non-TG data slots and in which the downlink data frame of the downlink signal 204 has been successfully decoded by the processor 201; (b) filling the ACK indication into the two successive non-TG control slots which are without corresponding to two non-TG data slots of the 15 non-TG data slots and in which the downlink data frame of the downlink signal 204 has been successfully decoded by the processor 201 unless the previous two successive non-TG control slots are filled with the ACK indication; and (c) filling the ACK indication into a last non-TG control slot of the remaining non-TG slot which corresponds to a last non-TG data slot of the 15 non-TG data slots and in which the previous two successive non-TG control slots are filled with the ACK indication. Moreover, in a case that there are an odd number of TG slots in this minimum TTI in the compressed mode, the processor 201 further fills the NACK indication into the last non-TG control slot of the remaining non-TG slots corresponding to a last slot within two radio frames when its previous two successive non-TG control slots are filled with the NACK indication.

In other words, for the last non-TG control slot of the remaining non-TG slots, as long as it corresponds to the last slot in the minimum TTI and its previous two successive non-TG control slots filled with the NACK indication, the processor 201 shall always fill the NACK indication regardless of whether the downlink data frame of the downlink signal 204 has been decoded successfully yet since it has no followed up non-TG control slot to constitute an ACK command with it.

In other embodiment, the processor 201 fills the NACK indication or the ACK indication into the last non-TG control slot in the minimum TTI depending on whether the downlink data frame of the downlink signal 204 has been decoded successfully yet. Specifically, the processor 201 further fills the NACK indication into the last non-TG control slot of the remaining non-TG slots which corresponds to the last slot within two radio frames and in which the downlink data frame has not been successfully decoded by the processor, and fills the ACK indication into the last non-TG control slot of the remaining non-TG slots which corresponds to the last slot within two radio frames and in which the downlink data frame has successfully decoded and the previous two successive non-TG control slots are filled with the NACK indication.

For example, as shown in the situation I of FIG. 7A, the 2-bit NACK indications are carried in Slot #11 to Slot #12 and the 2-bit ACK indications are carried in Slot #13 to Slot #15 in the normal mode. In this case, since the two 2-bit NACK indications carried in Slot #11 and Slot #12 constitute an ACK command and the two 2-bit ACK indications carried in Slot #13 and Slot #14 constitute an ACK command, the downlink data frame of the downlink signal 204 may have been successfully decoded at the time point of Slot #12 or Slot #13. In other words, even the downlink data frame of the downlink signal 204 has been successfully decoded at the time point of Slot #12, the processor 201 has to fill the NACK indication into Slot #12 to make the ACK command constituted by the two 2-bit NACK indications carried in Slot #11 and Slot #12 complete. In addition, Slot #15 of DPCCH is filled with the 2-bit ACK indication since it is the last non-TG control slot of the remaining non-TG slot corresponding to the last non-TG data slot of the 15 non-TG data slots and its previous two consecutive non-TG control slots (i.e. Slot #13 and Slot #14) are filled with the ACK indication.

The situation II in FIG. 7A shows that the 2-bit NACK indications are carried in Slot #11 to Slot #14 in the normal mode. In this case, since the two 2-bit NACK indications carried in Slot #11 and Slot #12 constitute an ACK command, the two 2-bit NACK indications carried in Slot #13 and Slot #14 constitute an ACK command and the two 2-bit ACK indications carried in Slot #15 and Slot #16 constitute an ACK command, the downlink data frame of the downlink signal 204 may have been successfully decoded at the time point of Slot #14 or Slot #15. Similarly, even the downlink data frame of the downlink signal 204 has been successfully decoded at the time point of Slot #14, the processor 201 has to fill the NACK indication into Slot #14 to make the ACK command constituted by the two 2-bit NACK indications carried in Slot #13 and Slot #14 complete.

FIG. 7B depicts the UL DPDCH and the UL DPCCH of the uplink signal 202 transmitted in the compressed mode of the present embodiment. The situation I in FIG. 7B shows that the two 2-bit NACK indications carried in Slot #11 and in Slot #16 constitutes an ACK command. Afterwards, the processor 201 fills 2-bit ACK indications into Slot #17 to Slot #19 in which the downlink data frame of the downlink signal 204 has been decoded successfully. In this case, the downlink data frame of the downlink signal 204 may have been successfully decoded at the time point of Slot #16 or Slot #17.

Similarly, as shown in situation II of FIG. 7B, the 2-bit NACK indications are carried in Slot #11 and Slot #16 to Slot #18. Since the two 2-bit NACK indications carried in Slot #11 and in Slot #16 constitute an ACK command, the two 2-bit NACK indications carried in Slot #17 and Slot #18 constitute an ACK command, and the two 2-bit ACK indications carried in Slot #19 and Slot #20 constitute an ACK command, the downlink data frame of the downlink signal 204 may have been successfully decoded at the time point of Slot #18 or Slot #19.

In addition, the situation I of FIG. 7C shows that the downlink data frame of downlink signal 204 has not been successfully decoded at the time point of Slot #28. In this case, since the two 2-bit NACK indications carried in Slot #28 and Slot #29 constitute an ACK command, the processor 201 further fills a 2-bit NACK indication into Slot #30, which is the last non-TG control slot of the remaining non-TG slots corresponding to the last slot within two radio frames (a minimum TTI) and in which the previous two successive non-TG slots (i.e., Slot #28 and Slot 29) are filled with the NACK indication. In other words, the processor 201 still fills the NACK indication into Slot #30 even though the downlink data frame of downlink signal 204 may have been decoded at the time point of Slot #29 or Slot #30.

As shown in the situation II of FIG. 7C, the downlink data frame of downlink signal 204 may have not been decoded successfully until the time point of Slot #29 or Slot #30. In this case, although the two 2-bit NACK indication carried in Slot #28 and Slot #29 constitute an ACK command and Slot #30 has no follow up slot in this minimum TTI to constitute an ACK command with it, the processor fills the 2-bit ACK into Slot #30 if the downlink data frame of downlink signal 204 have been decoded successfully at the time point of Slot #29 or Slot #30. Conversely, in the situation III of FIG. 7C, the processor 201 fills the 2-bit NACK indication into Slot #30, since the downlink data frame of downlink signal 204 has not been successfully decoded within the minimum TTI.

In other embodiment, due to the performance of the processor 201, the processor 201 might not be able to fill the 2-bit ACK indications into two successive non-TG control slots in which the downlink data frame of downlink signal 204 has just been successfully decoded. In this case, the processor 201 would fill the 2-bit NACK indications into two successive non-TG control slots.

For example, in the situation I of FIG. 7A, the downlink data frame of downlink signal 204 may have been successfully decoded at the time point of Slot #11; however, the processor 201 still fills the NACK indications into Slot #11 and Slot #12 since it is too late to fill the 2-bit ACK indications into Slot #11 and Slot #12. In another example of the situation II of FIG. 7B, the downlink data frame of downlink signal 204 may have been successfully decoded at the time point of Slot #17. In addition, in the situation II of FIG. 7C, the downlink data frame of downlink signal 204 may have been successfully decoded at the time point of Slot #28.

Figure 8A:
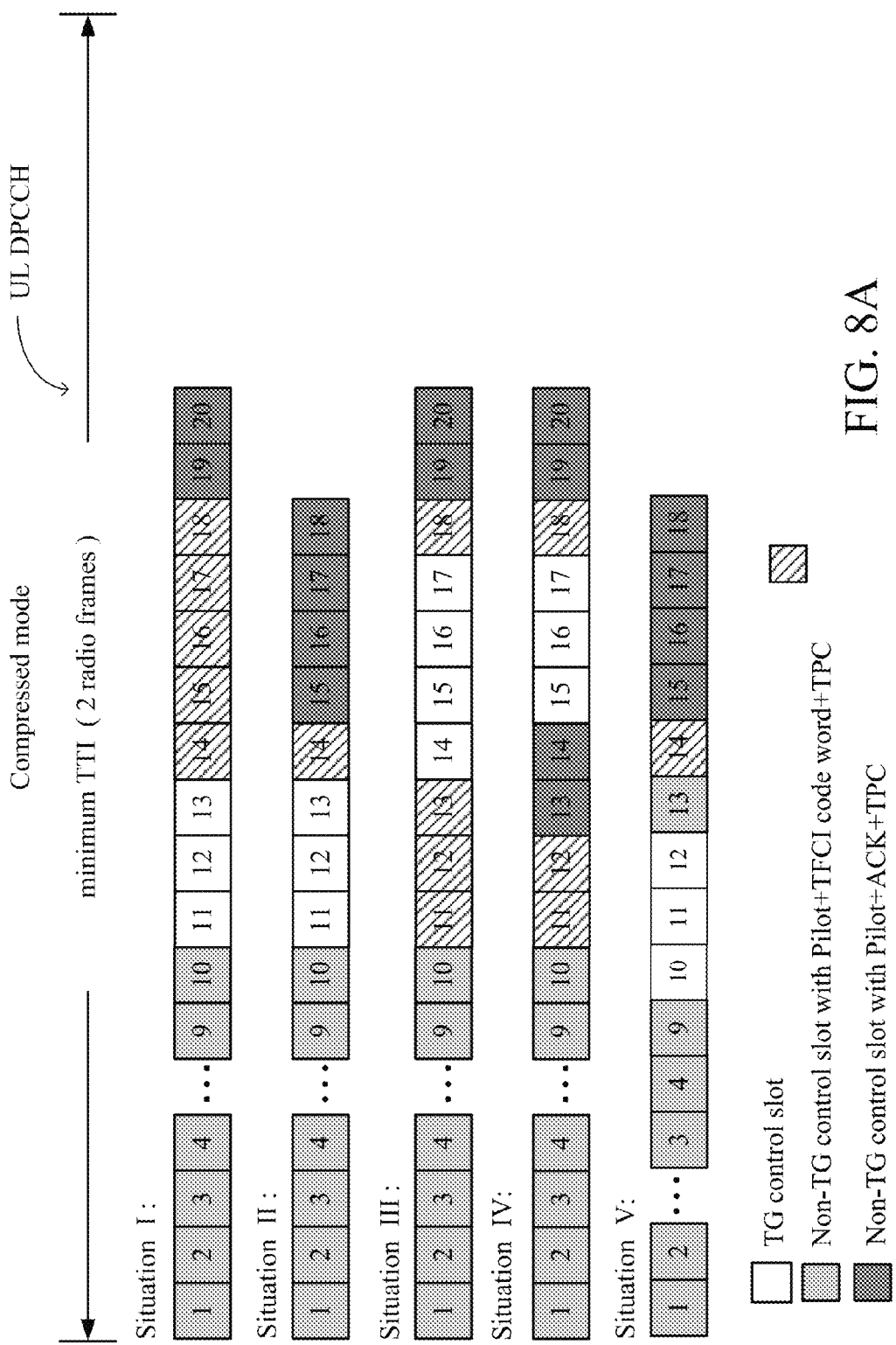
FIG. 8A depicts the UL DPCCH of the uplink signal in the compressed mode under different situations according to the sixth embodiment of the present invention.

A sixth embodiment of the present invention is shown in FIG. 8A. In this embodiment, the processor 201 also defines two 2-bit indications (two ACK indications or two NACK indications) as an ACK command; however, every two of the 2-bit indications carried in two consecutive non-TG control slots of the remaining non-TG control slots constitutes an ACK command. In other words, the present embodiment defines every two consecutive control slots which start with an odd-numbered slot as a command unit and each command unit may constitute an ACK command.

In this embodiment, regarding the normal mode, the processor 201 fills the ACK indications and the NACK indications by the same way as described in the fifth embodiments. However, regarding the compressed mode, there are various situations based on the number of the TG control slots. For those slots of a command unit which are fully occupied by TG or TFCI transmission and fail to constitute an ACK command, the processor 201 ignores the ACK command insertion. Beside, for those slots of a command unit which are partially occupied by TG or TFCI and fails to constitute an ACK command, the processor 201 fills the NACK indications into the non-occupied slots of these slots.

Specifically, the processor 201 fills the NACK indications into the two consecutive non-TG control slots in which the downlink data frame of the downlink signal 204 has not been successfully decoded by the processor 201. Moreover, the processor 201 executes the following operations: (a) filling the ACK indications into the two consecutive non-TG control slots which correspond to two non-TG data slots of the 15 non-TG data slots and in which the downlink data frame of the downlink signal 204 has been successfully decoded by the processor 201; (b) filling the ACK indication into the two consecutive non-TG control slots which are without corresponding to two non-TG data slots of the 15 non-TG data slots and in which the downlink data frame of the downlink signal 204 has been successfully decoded by the processor 201 unless the previous two consecutive non-TG control slots are filled with the ACK indication; (c) filling the ACK indication into a last non-TG control slot of the remaining non-TG slot which corresponds to a last non-TG data slot of the 15 non-TG data slots and in which the previous two consecutive non-TG control slots are filled with the ACK indication. In addition, the processor 201 further fills the NACK indication into the a non-TG control slot of the remaining non-TG slot which is an odd-numbered slot and has no follow-up non-TG control slot, and fills the NACK indication into a non-TG control slot of the remaining non-TG slot which is an even-numbered slot and without a preceding non-TG control slot of the remaining non-TG slots.

In this embodiment, the processor 201 fills the NACK indication into a non-TG control slot of the remaining non-TG slot, which is an even-numbered slot and without a preceding non-TG control slot of the remaining non-TG slot, or which is an odd-numbered slot and without a follow-up non-TG control slot of the remaining non-TG slots, regardless of whether the downlink data frame of the downlink signal 204 has been successfully and early decoded yet. As a result, the base station 5 may ignore the ACK commands in these slots and can take each ACK command which starts from an odd-numbered slot.

For example, the situation I in FIG. 8A shows that a NACK indication is filled into Slot #14 since it is an even-number slot and its preceding Slot #13 is not a non-TG control slot. In this case, the base station 5 can take Slot #15 and Slot #16 as an ACK command, Slot #17 and Slot #18 as an ACK command, and so on. On the other hand, the situation II in FIG. 8A shows that a NACK indication is filled into Slot #14 since Slot #14 is an even-number slot and its preceding Slot #13 is not a non-TG control slot of the remaining non-TG slots even though the downlink data frame of the downlink signal 204 may have been successfully decoded by the processor 201 at the time point of Slot #14. Similarly, in this case, the base station 5 can take Slot #15 and Slot #16 as an ACK command and Slot #17 and Slot #18 as an ACK command.

Furthermore, the situation III in FIG. 8A shows that Slot #13 is filled with the 2-bit NACK indication since its follow-up Slot #14 is a TG control slot and is unable to be constituted an ACK command with Slot #13. In addition, a NACK indication is filled into Slot #18 since it is an even-number slot and its preceding Slot #17 is not a non-TG control slot of the remaining non-TG slots even though the downlink data frame of the downlink signal 204 may have been successfully decoded by the processor 201 at the time point of Slot #13 or Slot #18. In this case, the base station 5 can take Slot #11 and Slot #12 as an ACK command and Slot #19 and Slot #20 as an ACK command.

Similarly, as shown in the situation IV of FIG. 8A, a NACK indication is filled into Slot #18 which is an even-number slot and whose preceding Slot #17 is not a non-TG control slot, even though the downlink data frame of the downlink signal 204 has been successfully decoded. In addition, the situation V in FIG. 8A shows that a NACK indication is filled into Slot #14 since it is an even-number slot and its preceding Slot #13 carries TFCI code word.

As previously described, in other embodiment, due to the performance of the processor 201, the processor 201 might not be able to fill the 2-bit ACK indications into two consecutive non-TG control slots in which the downlink data frame of downlink signal 204 has just been successfully decoded. In this case, the processor 201 would fill the 2-bit NACK indications into two consecutive non-TG control slots too late.

For example, in the situation I of FIG. 8A, the downlink data frame of downlink signal 204 may have been successfully decoded at the time point of Slot #17; however, the processor 201 still fills the NACK indications into Slot #17 and Slot #18 since it is too late to fill the 2-bit ACK indications into Slot #17 and Slot #18. In addition, taking the situation III of FIG. 8A as an example, the downlink data frame of downlink signal 204 may be decoded successfully at the time point of Slot #11; however, it is too late for the processor 201 to timely fill the ACK indications into Slot #11 and Slot #12.

Figure 8B:
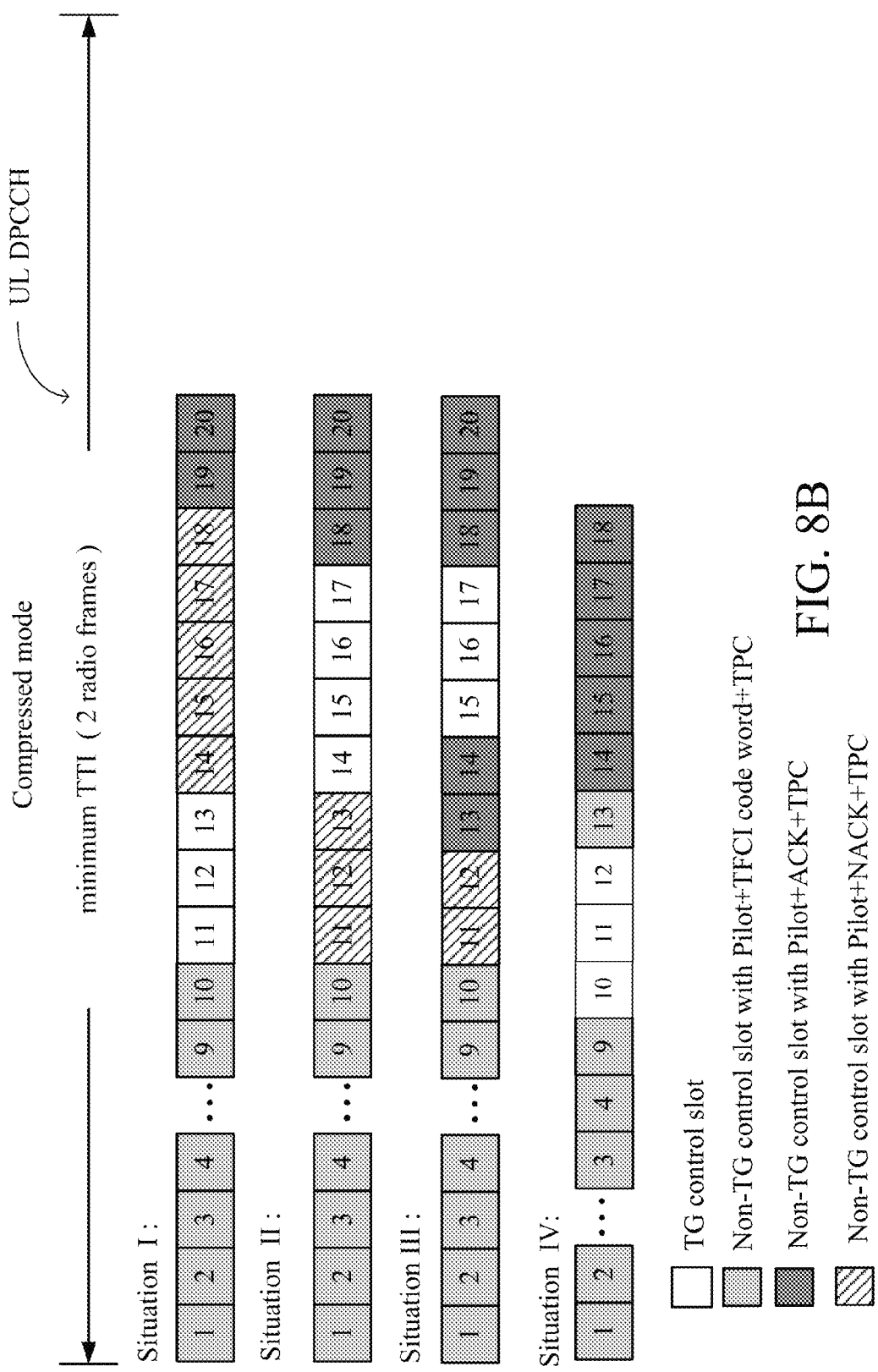
FIG. 8B depicts the UL DPCCH of the uplink signal in the compressed mode under different situations according to the seventh embodiment of the present invention.

A seventh embodiment of the present invention is shown in FIG. 8B. The seventh embodiment is partially modified from the sixth embodiment of the present invention. In this embodiment, those slots of a command unit which are partially occupied by TG or TFCI are still treated as an ACK command. Therefore, the processor 201 fills the ACK indication into the non-occupied slot of a command unit in which the downlink data frame of the downlink signal 204 has been successfully decoded by the processor 201. Conversely, the processor 201 fills the NACK indication into the non-occupied slot of a command unit in which the downlink data frame of the downlink signal 204 has not been successfully decoded by the processor 201.

In detail, the processor 201 fills a NACK indication into a non-TG control slot of the remaining non-TG slot which is an odd-numbered slot and has no follow-up non-TG control slot and in which the downlink data frame of the downlink signal 204 has not been successfully decoded by the processor 201, and fills an ACK indication into a non-TG control slot of the remaining non-TG slot which is an odd-numbered slot and has no follow-up non-TG control slot and in which the downlink data frame of the downlink signal 204 has successfully decoded by the processor 201. In addition, the processor 201 further fills a NACK indication into a non-TG control slot of the remaining non-TG slot which is an even-numbered slot and without a preceding non-TG control slot of the remaining non-TG slots and in which the downlink data frame of the downlink signal 204 has not been successfully decoded by the processor 201. Conversely, the processor 201 fills an ACK indication into a non-TG control slot of the remaining non-TG slot which is an even-numbered slot and without a preceding non-TG control slot of the remaining non-TG slots and in which the downlink data frame of the downlink signal 204 has been successfully decoded by the processor 201.

In other words, based on whether the downlink data frame of the downlink signal 204 has been decoded successfully yet, the processor 201 fills an ACK or a NACK indication into a non-TG control slot of the remaining non-TG slot which is an even-numbered slot and without a preceding non-TG control slot of the remaining non-TG slots, or which is an odd-numbered slot and without a follow-up non-TG control slot of the remaining non-TG slots. It should be appreciated that the base station 5 in this embodiment can also take the ACK command from an odd-numbered slot and its follow-up even-numbered slot as described in the sixth embodiment.

For example, as shown in situation I of FIG. 8B, Slot #14 is an even-numbered slot and its preceding slot #13 is a TG slot. In this case, Slot #14 is filled with a 2-bit NACK indication since the downlink data frame of the downlink signal 204 has not been decoded successfully at the time point of Slot #14. Moreover, since two 2-bit ACK indications carried in Slot #19 and Slot #20 is an ACK command, the downlink data frame of the downlink signal 204 has been successfully decoded at the time point of Slot #18 or Slot #19. In addition, the base station 5 can take every odd-numbered slot and its follow-up even-numbered slot as an ACK command.

Situation II of FIG. 8B shows that Slot #13, which is an odd-numbered slot and whose follow-up Slot #14 is a TG-slot, is filled with a 2-bit NACK indication since the downlink data frame of downlink signal 204 has not been decoded successfully at the time point of Slot #13. On the other hand, a 2-bit ACK indication is further filled into Slot #18 since the downlink data frame of the downlink signal 204 has been decoded successfully at the time point of Slot #18. Then, the processor 201 further fills two 2-bit ACK indications into Slot #19 and Slot #20 to complete an ACK commend. In this case, the base station 5 also can take every odd-numbered slot and its follow-up even-numbered slot as an ACK command.

Moreover, the situation III of FIG. 8B shows that Slot #18, which is an even-numbered slot and whose preceding slot #17 is a TG slot, is filled with a 2-bit ACK indication since the downlink data frame of downlink signal 204 has been decoded successfully at the time point of Slot #12 or Slot #13. Furthermore, the situation IV of FIG. 8B shows that Slot #14, which is an even-numbered slot and whose preceding slot #13 is not a non-TG control slot of the remaining non-TG slots, is filled with a 2-bit ACK indication since the downlink data frame of downlink signal 204 has been decoded successfully at the time point of Slot #14.

As aforementioned, in other embodiment, due to the performance of the processor 201, the processor 201 might not be able to fill the 2-bit ACK indications into a non-TG control slot in which the downlink data frame of downlink signal 204 has just been successfully decoded by the processor 201. In this case, the processor 201 would fill the 2-bit NACK indications into a non-TG control slots too late.

For example, in the situation II of FIG. 8B, the downlink data frame of downlink signal 204 may have been successfully decoded at the time point of Slot #13; however, the processor 201 still fills the NACK indication into Slot #13 since it is too late to fill the 2-bit ACK indication into Slot #13. In addition, taking the situation III of FIG. 8B as an example, the downlink data frame of downlink signal 204 may be decoded successfully at the time point of Slot #11; however, the processor 201 still fills the NACK indications into Slot #11 and Slot #12 since it is too late for the processor 201 to timely fill the ACK indications into Slot #11 and Slot #12.

Likewise, in other embodiments, the processor 201 may further boost a transmission power of the ACK indications so that the transmission power of the ACK indications is larger than that of the NACK indications. Due to the power enhancement in the ACK indications, the base station 5 is capable of more accurately detecting the ACK indications so that the base station 5 can terminate the transmission of the downlink data frame of the downlink signal 204 according to the ACK indications.

An eighth embodiment of the present invention is an extension of the first to seventh embodiments. The TFCI code word on the UL DPCCH in this embodiment has indication information indicating the transmission type of the uplink signal 202. Moreover, in another embodiment, the processor 201 may generates a radio resource control (RRC) message indicating the transmission type of the uplink signal 202 and the transceiver 203 transmits the RRC message to the base station 5 in an initial connection establishment procedure. Accordingly, the base station 5 can be informed of the transmission type via the RRC message or the TFCI code word.

In other embodiments, the processor 201 may further select the transmission type from two transmission types (i.e. the first transmission type and the second transmission type) so as to generate the uplink signal 202. Specifically, the first transmission type of the present invention is depicted in FIG. 3A, which uses the first 15 non-TG data slots of 30 data slots within the 20 milliseconds TTI (i.e. two radio frames) to carry user data. And, the second transmission type of the present invention is depicted in FIG. 3B, which uses all non-TG data slots of 30 data slots within the 20 milliseconds TTI to carry user data, as depicted in FIG. 3B.

In addition, the transmission power of the first 15 non-TG data slots in the first transmission type is larger than the transmission power of the non-TG data slots in the second transmission type. Thus, in some situations (e.g. an uplink power limited situation or a function limited situation to the handheld device 2), the processor 201 may select the second transmission type rather than the first transmission type and generate an uplink signal according to the second transmission type.

Figure 9:
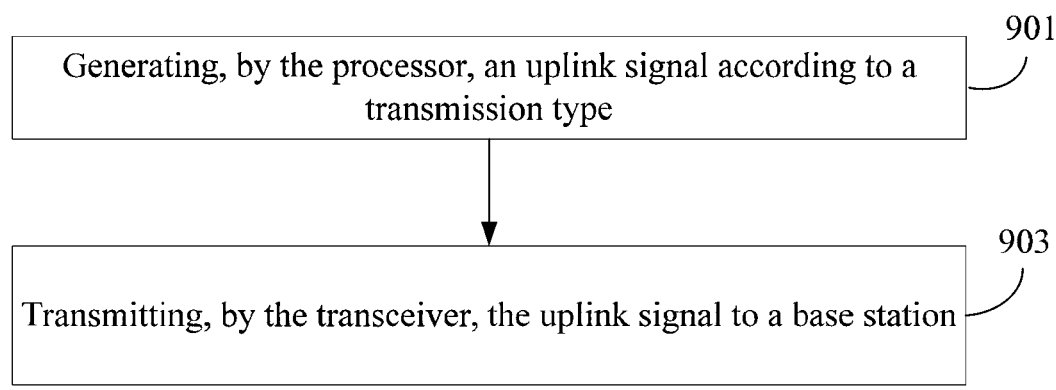
FIG. 9 is a flowchart diagram of a transmission control method according to the ninth embodiment of the present invention.

A ninth embodiment of the present invention is a transmission control method, a flowchart diagram of which is shown in FIG. 9. The transmission control method is for use in a handheld device, e.g., the handheld device 2 of the aforesaid embodiments. The handheld device comprises a processor and a transceiver. The transceiver is electrically connected to the processor.

Firstly, step 901 is executed by the processor to generate an uplink signal according to a transmission type. The uplink signal comprises an uplink dedicated physical data channel (UL DPDCH). The UL DPDCH has only 15 non-transmission gap (non-TG) data slots within two radio frames to carry user data. Afterwards, step 903 is executed by the transceiver of the handheld device to transmit the uplink signal to a base station.

As described earlier, the spreading factor applied to the UL DPDCH according to the first transmission type may be determined by Equation 1. In addition, the nominal power relation in the first transmission type may be defined by Equation 2. In other embodiments, the uplink signal further comprises an uplink dedicated physical control channel (UL DPCCH). The UL DPCCH has at least 15 non-TG control slots within the two radio frames. Each of the at least 15 non-TG control slots has a transport format combination indicator (TFCI) field. The TFCI fields of first 10 non-TG control slots of the at least 15 non-TG control slots carry a TFCI code word, and the TFCI fields of remaining non-TG control slots of the at least 15 non-TG control slots carry acknowledgement (ACK) information for downlink data frame early termination.

In detail, the ACK information comprises a plurality of 2-bit indications. Each of the 2-bit indication is carried in one of the remaining non-TG control slots, and each of the 2-bit indication is one of an acknowledgement (ACK) indication and a negative-acknowledgment (NACK) indication. In the case that each 2-bit indications carried in a single non-TG control slot constitutes an ACK command, step 901 may further comprises the steps of filling the NACK indication into a non-TG control slot in which a downlink data frame has not been successfully decoded by the processor; and filling the ACK indication into a non-TG control slot in which the downlink data frame has been successfully decoded by the processor. On the other hand, step 901 may comprise the step of boosting a transmission power of the ACK indication so that the transmission power of the ACK indication is larger than a transmission power of the NACK indication.

In other embodiments, every two 2-bit indications carried in two successive non-TG control slots of the remaining non-TG control slots constitutes an ACK command. In such a case, step 901 may further comprises the steps of: filling the NACK indications into the two successive slots in which the downlink data frame has not been successfully decoded by the processor; filling the ACK indications into the two successive non-TG control slots which correspond to two non-TG data slots of the 15 non-TG data slots and in which the downlink data frame has been successfully decoded by the processor; filling the ACK indication into the two successive non-TG control slots which are without corresponding to two non-TG data slots of the 15 non-TG data slots and in which the downlink data frame has been successfully decoded unless the previous two successive non-TG control slots are filled with the ACK indication; filling the ACK indication into a last non-TG control slot of the remaining non-TG slot corresponding to a last non-TG data slot of the 15 non-TG data slots when the two successive non-TG control slots previous to the last non-TG control slot are filled with the ACK indications; and filling, by the processor, the NACK indication into the last non-TG control slot of the remaining non-TG slots corresponding to a last slot within two radio frames when the previous two successive non-TG control slots are filled with the NACK indication.

In other embodiments, every two of the 2-bit indications carried in two successive non-TG control slots of the remaining non-TG control slots constitutes an ACK command. In such a case, step 901 may further comprises the steps of: filling, by the processor, the NACK indication into the two successive slots in which a downlink data frame has not been successfully decoded by the processor; filling, by the processor, the ACK indication into the two successive non-TG control slots which correspond to two non-TG data slots of the 15 non-TG data slots and in which the downlink data frame has successfully decoded by the processor; filling, by the processor, the ACK indication into the two successive non-TG control slots which are without corresponding to two non-TG data slots of the 15 non-TG data slots and in which the downlink data frame has successfully decoded by the processor unless previous two successive non-TG control slots are filled with the ACK indication; filling, by the processor, the ACK indication into a last non-TG control slot of the remaining non-TG slot corresponding to a last non-TG data slot of the 15 non-TG data slots when the two successive non-TG control slots previous to the last non-TG control slot are filled with the ACK indications; filling, by the processor, the NACK indication into the last non-TG control slot of the remaining non-TG slots which corresponds to a last slot within two radio frames and in which the downlink data frame has not been successfully decoded by the processor; and filling, by the processor, the ACK indication into the last non-TG control slot of the remaining non-TG slots which corresponds to the last slot within two radio frames and in which the downlink data frame has successfully decoded by the processor and the previous two successive non-TG control slots are filled with the NACK indication.

In other embodiments, every two 2-bit indications carried in two consecutive non-TG control slots of the remaining non-TG control slots constitutes an ACK command. In such a case, step 901 may further comprises the steps of: filling the NACK indications into the two consecutive slots in which a downlink data frame has not been successfully decoded by the processor; filling the ACK indications into the two consecutive non-TG control slots which correspond to two non-TG data slots of the 15 non-TG data slots and in which the downlink data frame has been successfully decoded by the processor; filling the ACK indication into the two consecutive non-TG control slots which are without corresponding to two non-TG data slots of the 15 non-TG data slots and in which the downlink data frame has been successfully decoded by the processor unless the previous two consecutive non-TG control slots are filled with the ACK indication; filling the ACK indication into a last non-TG control slot of the remaining non-TG slot corresponding to a last non-TG data slot of the 15 non-TG data slots when the two consecutive non-TG control slots previous to the last non-TG control slot are filled with the ACK indications; filling the NACK indication into a non-TG control slot of the remaining non-TG slot, which is an odd-numbered slot and has no follow-up non-TG control slot; and filling the NACK indication into a non-TG control slot of the remaining non-TG slot which is an even-numbered slot and without a preceding non-TG control slot of the remaining non-TG slot.

In another embodiment, every two of the 2-bit indications carried in two consecutive non-TG control slots of the remaining non-TG control slots constitutes an ACK command. However, in this embodiment, step 901 may further comprise the following steps of filling the NACK indication into the two consecutive slots in which a downlink data frame has not been successfully decoded by the processor; filling the ACK indication into the two consecutive non-TG control slots which corresponds to two non-TG data slots of the 15 non-TG data slots and in which the downlink data frame has been successfully decoded by the processor; filling the ACK indication into the two consecutive non-TG control slots which are without corresponding to two non-TG data slots of the 15 non-TG data slots and in which the downlink data frame has successfully decoded by the processor unless the previous two consecutive non-TG control slots are filled with the ACK indication; filling the ACK indication into a last non-TG control slot of the remaining non-TG slot corresponding to a last non-TG data slot of the 15 non-TG data slots when the two consecutive non-TG control slots previous to the last non-TG control slot are filled with the ACK indications; filling the NACK indication into a non-TG control slot of the remaining non-TG slot which is an odd-numbered slot and has no follow-up non-TG control slot and in which the downlink data frame has not successfully decoded by the processor; filling the ACK indication into a non-TG control slot of the remaining non-TG slot which is an odd-numbered slot and has no follow-up non-TG control slot and in which the downlink data frame has been successfully decoded by the processor; filling the NACK indication into a non-TG control slot of the remaining non-TG slot which is an even-numbered slot and without a preceding non-TG control slot of the remaining non-TG slot and in which the downlink data frame has not been successfully decoded by the processor; and filling the ACK indication into a non-TG control slot of the remaining non-TG slot which is an even-numbered slot and without a preceding non-TG control slot of the remaining non-TG slot and in which the downlink data frame has successfully decoded by the processor.

Besides, in other embodiments, the transmission control method may further comprise the steps of: generating, by the processor, a radio resource control (RRC) message indicating the transmission type; and transmitting, by the transceiver, the RRC message to the base station in an initial connection establishment procedure. Instead of using the RRC message to indicate the transmission type, in another embodiment, the TFCI code word may have the indication information to indicate the transmission type. And, in another embodiment, the transmission control method of the present invention may further comprise the step of: selecting, by the processor, the transmission type from two transmission types so as to generate the uplink signal.

In addition to the aforesaid steps, the transmission control method of the present embodiment can also execute all the operations and corresponding functions set forth in the first to eighth embodiment. How to execute these operations and functions will be readily appreciated by those of ordinary skill in the art based on the explanation of the first to sixth embodiments, and thus will not be further described herein.

Figure 10:
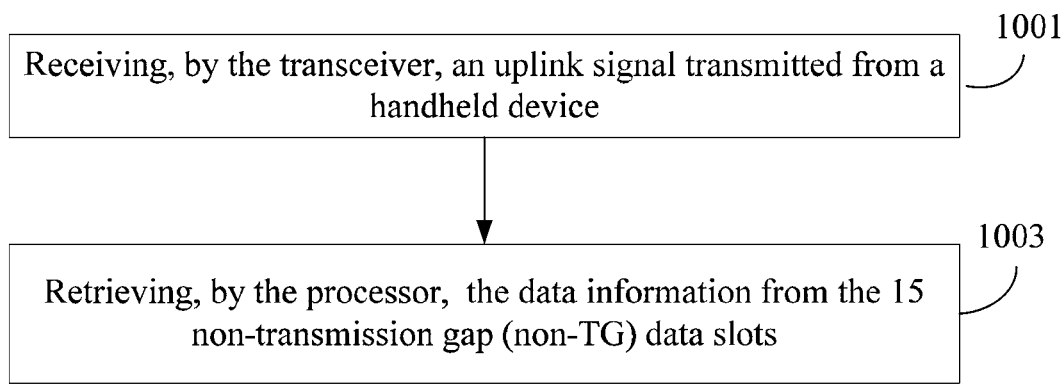
FIG. 10 is a flowchart diagram of a transmission control method according to the tenth embodiment of the present invention.

A tenth embodiment of the present invention is a transmission control method, a flowchart diagram of which is shown in FIG. 10. The transmission control method is for use in a base station, e.g., the base station 5 of the first to sixth embodiments. The base station comprises a transceiver and a processor. The transceiver is electrically connected to the processor. Firstly, step 1001 is executed by the transceiver to receive an uplink signal transmitted from a handheld device. The uplink signal comprises an uplink dedicated physical data channel (UL DPDCH). The UL DPDCH has only 15 non-transmission gap (non-TG) data slots within two radio frames to carry data information. Then, step 1003 is executed by the processor to retrieve the user data from the 15 non-transmission gap (non-TG) data slots.

In addition, the uplink signal further comprises an uplink dedicated physical control channel (UL DPCCH). The UL DPCCH has at least 15 non-TG control slots within the two radio frames. Each of at least 15 non-TG control slots has a transport format combination indicator (TFCI) field. The TFCI fields of first 10 non-TG control slots of the at least 15 non-TG control slots carry a TFCI code word, and the TFCI fields of remaining non-TG control slots of the at least 15 non-TG control slots carry acknowledgement (ACK) information for downlink data frame early termination. Accordingly, the transmission control method of this embodiment can further comprise the steps of: generating, by the processor, a downlink signal; transmitting, by the transceiver, the downlink signal to the handheld device; and enabling, by the processor, the transceiver to terminate transmission of a downlink data frame of the downlink signal according to the ACK information.

In other embodiments, the transmission control method of the present invention may further comprise the steps of: receiving, by the transceiver, a radio resource control (RRC) message indicating the transmission type from the handheld device in an initial connection establishment procedure. Instead of using the RRC message to indicate the transmission type, in another embodiment, the TFCI code word may have the indication information to indicate the transmission type. As set forth in the sixth embodiments, the handheld device generates the uplink signal based on the transmission type and the transmission type may be selected from two transmission types.

In addition to the aforesaid steps, the transmission control method of the present embodiment can also execute all the operations and corresponding functions set forth in the first to eighth embodiments. How to execute these operations and functions will be readily appreciated by those of ordinary skill in the art based on the explanation of the first to sixth embodiment, and thus will not be further described herein.

According to the above descriptions, the transmission control mechanism of the present invention can reduce the power consumption in the user device in such a case that downlink data is successfully and early decoded or the base station also use the first 15 non-transmission gap (non-TG) data slots in two radio frames of DL DPDCH to carry the downlink data. In addition, based on the ACK information carried in the TFCI fields of the UL DPCCH of the uplink signal received from a handheld device, the base station can terminate the transmission of the downlink data frame of the downlink signal to the handheld device and reallocate the transmission power of different downlink signals for multiple user devices so as to reduce the interference among the downlink signals.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A handheld device comprising:
a processor, being configured to generate an uplink signal according to a transmission type; and
a transceiver, being electrically connected to the processor and configured to transmit the uplink signal to a base station;
wherein the uplink signal comprises an uplink dedicated physical data channel (UL DPDCH), and the processor is configured to use only 15 non-transmission gap (non-TG) data slots within two radio frames of UL DPDCH to carry user data without using all non-TG data slots within the two radio frames of the UL DPDCH to carry the user data for reducing power consumption in the handheld device when the processor has successfully and early decoded a downlink data frame of downlink data received from the base station or when the base station only uses 15 non-TG data slots within the two radio frames of DL DPDCH to carry the downlink data.

2. The handheld device as claimed in claim 1, wherein, the uplink signal further comprises an uplink dedicated physical control channel (UL DPCCH) having at least 15 non-TG control slots within the two radio frames, each of the at least 15 non-TG control slots has a transport format combination indicator (TFCI) field, the TFCI fields of first 10 non-TG control slots of the at least 15 non-TG control slots carry a TFCI code word, and the TFCI fields of remaining non-TG control slots of the at least 15 non-TG control slots carry acknowledgement (ACK) information for downlink data frame early termination.

3. The handheld device as claimed in claim 2, wherein the TFCI code word is a truncated 20-bit TFCI code word from a 32-bit TFCI code word corresponding to a 10-bit TFCI information, and each of the TFCI field of the first 10 non-TG control slots carries 2 bits of the truncated 20-bit TFCI code.

4. The handheld device as claimed in claim 2, wherein the ACK information comprises a plurality of 2-bit indications, each of the 2-bit indication is carried in one of the remaining non-TG control slots, and each of the 2-bit indication is one of an acknowledgement (ACK) indication and a negative-acknowledgment (NACK) indication.

5. The handheld device as claimed in claim 4, wherein every two of the 2-bit indications carried in two successive non-TG control slots of the remaining non-TG control slots constitutes an ACK command, and the processor further executes the following operations:
filling the NACK indication into the two successive non-TG control slots in which a downlink data frame has not been successfully decoded by the processor;
filling the ACK indication into the two successive non-TG control slots which correspond to two non-TG data slots of the 15 non-TG data slots in which the downlink data frame has been successfully decoded by the processor;
filling the ACK indication into the two successive non-TG control slots which are without corresponding to two non-TG data slots of the 15 non-TG data slots and in which the downlink data frame has been successfully decoded by the processor unless previous two successive non-TG control slots of the two successive non-TG control slots are filled with the ACK indication;
filling the ACK indication into a last non-TG control slot of the remaining non-TG slots corresponding to a last non-TG data slot of the 15 non-TG data slots when the previous two successive non-TG control slots are filled with the ACK indication; and
filling the NACK indication into the last non-TG control slot of the remaining non-TG slots corresponding to a last slot within the two radio frames when the previous two successive non-TG control slots are filled with the NACK indication.

6. The handheld device as claimed in claim 4, wherein every two of the 2-bit indications carried in two successive non-TG control slots of the remaining non-TG control slots constitutes an ACK command, and the processor further executes the following operations:

filling the NACK indication into the two successive non-TG control slots in which a downlink data frame has not been successfully decoded by the processor;

filling the ACK indication into the two successive non-TG control slots which correspond to two non-TG data slots of the 15 non-TG data slots and in which the downlink data frame has been successfully decoded by the processor;

filling the ACK indication into the two successive non-TG control slots which are without corresponding to two non-TG data slots of the 15 non-TG data slots and in which the downlink data frame has been successfully decoded by the processor unless previous two successive non-TG control slots are filled with the ACK indication;

filling the ACK indication into a last non-TG control slot of the remaining non-TG slots corresponding to a last non-TG data slot of the 15 non-TG data slots when the previous two successive non-TG control slots are filled with the ACK indication;

filling the NACK indication into the last non-TG control slot of the remaining non-TG slots which corresponds to a last slot within two radio frames and in which the downlink data frame has not been successfully decoded by the processor; and filling the ACK indication into the last non-TG control slot of the remaining non-TG slots which corresponds to the last slot within two radio frames and in which the downlink data frame has successfully decoded by the processor and the previous two successive non-TG control slots are filled with the NACK indication.

7. The handheld device as claimed in claim 4, wherein every two of the 2-bit indications carried in two consecutive non-TG control slots of the remaining non-TG control slots constitutes an ACK command, and the processor further executes the following operations:

filling the NACK indication into the two consecutive non-TG control slots in which a downlink data frame has not been successfully decoded by the processor;

filling the ACK indication into the two consecutive non-TG control slots which correspond to two non-TG data slots of the 15 non-TG data slots and in which the downlink data frame has been successfully decoded by the processor;

filling the ACK indication into the two consecutive non-TG control slots which are without corresponding to two non-TG data slots of the 15 non-TG data slots and in which the downlink data frame has been successfully decoded by the processor unless the previous two consecutive non-TG control slots are filled with the ACK indication;

filling the ACK indication into a last non-TG control slot of the remaining non-TG slot corresponding to a last non-TG data slot of the 15 non-TG data slots when the previous two consecutive non-TG control slots are filled with the ACK indication;

filling the NACK indication into a non-TG control slot of the remaining non-TG slot which is an odd-numbered slot and has no follow-up non-TG control slot; and filling the NACK indication into a non-TG control slot of the remaining non-TG slot which is an even-numbered slot and without a preceding non-TG control slot of the remaining non-TG slots.

8. The handheld device as claimed in claim 4, wherein every two of the 2-bit indications carried in two consecutive non-TG control slots of the remaining non-TG control slots constitutes an ACK command, and the processor further executes the following operations:

filling the NACK indication into the two consecutive non-TG control slots in which a downlink data frame has not been successfully decoded by the processor;

filling the ACK indication into the two consecutive non-TG control slots which correspond to two non-TG data slots of the 15 non-TG data slots and in which the downlink data frame has been successfully decoded by the processor;

filling the ACK indication into the two consecutive non-TG control slots which are without corresponding to two non-TG data slots of the 15 non-TG data slots and in which the downlink data frame has been successfully decoded by the processor unless the previous two consecutive non-TG control slots are filled with the ACK indication;

filling the ACK indication into a last non-TG control slot of the remaining non-TG slot corresponding to a last non-TG data slot of the 15 non-TG data slots when the previous two consecutive non-TG control slots are filled with the ACK indication;

filling the NACK indication into a non-TG control slot of the remaining non-TG slot which is an odd-numbered slot and has no follow-up non-TG control slot and in which the downlink data frame has not successfully decoded by the processor; and filling the ACK indication into a non-TG control slot of the remaining non-TG slot which is an odd-numbered slot and has no follow-up non-TG control slot and in which the downlink data frame has been successfully decoded by the processor;

filling the NACK indication into a non-TG control slot of the remaining non-TG slot which is an even-numbered slot and without a preceding non-TG control slot of the remaining non-TG slots and in which the downlink data frame has not been successfully decoded by the processor; and fills the ACK indication into a non-TG control slot of the remaining non-TG slot which is an even-numbered slot and without a preceding non-TG control slot of the remaining non-TG slots and in which the downlink data frame has been successfully decoded by the processor.

9. A transmission control method for use in a handheld device, the handheld device comprising a processor and a transceiver, the transceiver being electrically connected to the processor, the transmission control method comprising the following steps:

(a) generating, by the processor, an uplink signal having an uplink dedicated physical data channel (UL DPDCH) according to a transmission type which configures the processor to use only 15 non-transmission gap (non-TG) data slots within two radio frames to carry user data without using all non-TG data slots within the two radio frames of the UL DPDCH to carry the user data for reducing power consumption in the handheld device when the processor has successfully and early decoded a downlink data frame of downlink data received from the base station or when the base station only uses 15 non-TG data slots within the two radio frames of DL DPDCH to carry the downlink data; and (b) transmitting, by the transceiver, the uplink signal to a base station.

10. The transmission control method as claimed in claim 9, wherein the uplink signal further comprises an uplink dedicated physical control channel (UL DPCCH) having at least 15 non-TG control slots within the two radio frames, each of the at least 15 non-TG control slots has a transport format combination indicator (TFCI) field, the TFCI fields of first 10 non-TG control slots of the at least 15 non-TG control slots carry a TFCI code word, and the TFCI fields of remaining non-TG control slots of the at least 15 non-TG control slots carry acknowledgement (ACK) information for downlink data frame early termination.

11. The transmission control method as claimed in claim 10, wherein the TFCI code word is a truncated 20-bit TFCI code word from a 32-bit TFCI code word corresponding to a 10-bit TFCI information, and each of the TFCI field of the first 10 non-TG control slots carries 2 bits of the truncated 20-bit TFCI code.

12. The transmission control method as claimed in claim 10, wherein the ACK information comprises a plurality of 2-bit indications, each of the 2-bit indication is carried in one of the remaining non-TG control slots, and each of the 2-bit indication is one of an acknowledgement (ACK) indication and a negative-acknowledgment (NACK) indication.

13. The transmission control method as claimed in claim 12, wherein every two of the 2-bit indications carried in two successive non-TG control slots of the remaining non-TG control slots constitutes an ACK command, and the transmission control method further comprises the following steps:
　filling, by the processor, the NACK indication into the two successive slots in which a downlink data frame has not been successfully decoded by the processor;
　filling, by the processor, the ACK indication into the two successive non-TG control slots which correspond to two non-TG data slots of the 15 non-TG data slots and in which the downlink data frame has successfully decoded by the processor;
　filling, by the processor, the ACK indication into the two successive non-TG control slots which are without corresponding to two non-TG data slots of the 15 non-TG data slots and in which the downlink data frame has been successfully decoded by the processor unless previous two successive non-TG control slots of the two successive non-TG control slots are filled with the ACK indication;
　filling, by the processor, the ACK indication into a last non-TG control slot of the remaining non-TG slot corresponding to a last non-TG data slot of the 15 non-TG data slots when the two successive non-TG control slots previous to the last non-TG control slot are filled with the ACK indications; and
　filling, by the processor, the NACK indication into the last non-TG control slot of the remaining non-TG slots corresponding to a last slot within two radio frames when the previous two successive non-TG control slots are filled with the NACK indication.

14. The transmission control method as claimed in claim 12, wherein every two of the 2-bit indications carried in two successive non-TG control slots of the remaining non-TG control slots constitutes an ACK command, and the transmission control method further comprises the following steps:
　filling, by the processor, the NACK indication into the two successive slots in which a downlink data frame has not been successfully decoded by the processor;
　filling, by the processor, the ACK indication into the two successive non-TG control slots which correspond to two non-TG data slots of the 15 non-TG data slots and in which the downlink data frame has successfully decoded by the processor;
　filling, by the processor, the ACK indication into the two successive non-TG control slots which are without corresponding to two non-TG data slots of the 15 non-TG data slots and in which the downlink data frame has successfully decoded by the processor unless previous two successive non-TG control slots are filled with the ACK indication;
　filling, by the processor, the ACK indication into a last non-TG control slot of the remaining non-TG slot corresponding to a last non-TG data slot of the 15 non-TG data slots when the two successive non-TG control slots previous to the last non-TG control slot are filled with the ACK indications;
　filling, by the processor, the NACK indication into the last non-TG control slot of the remaining non-TG slots which corresponds to a last slot within two radio frames and in which the downlink data frame has not been successfully decoded by the processor; and
　filling, by the processor, the ACK indication into the last non-TG control slot of the remaining non-TG slots which corresponds to the last slot within two radio frames and in which the downlink data frame has successfully decoded by the processor and the previous two successive non-TG control slots are filled with the NACK indication.

15. The transmission control method as claimed in claim 12, wherein every two of the 2-bit indications carried in two consecutive non-TG control slots of the remaining non-TG control slots constitutes an ACK command, and the transmission control method further comprises the following steps:
　filling, by the processor, the NACK indication into the two consecutive slots in which a downlink data frame has not been successfully decoded by the processor; and
　filling, by the processor, the ACK indication into the two consecutive non-TG control slots which correspond to two non-TG data slots of the 15 non-TG data slots and in which the downlink data frame has been successfully decoded by the processor;
　filling, by the processor, the ACK indication into the two consecutive non-TG control slots which are without corresponding to two non-TG data slots of the 15 non-TG data slots and in which the downlink data frame has successfully decoded by the processor unless the previous two consecutive non-TG control slots are filled with the ACK indication;
　filling, by the processor, the ACK indication into a last non-TG control slot of the remaining non-TG slot corresponding to a last non-TG data slot of the 15 non-TG data slots when the two consecutive non-TG control slots previous to the last non-TG control slot are filled with the ACK indications;
　filling, by the processor, the NACK indication into a non-TG control slot of the remaining non-TG slot which is an odd-numbered slot and has no follow-up non-TG control slot; and
　filling, by the processor, the NACK indication into a non-TG control slot of the remaining non-TG slot which is an even-numbered slot and without a preceding non-TG control slot of the remaining non-TG slot.

16. The transmission control method as claimed in claim 12, wherein every two of the 2-bit indications carried in two consecutive non-TG control slots of the remaining non-TG control slots constitutes an ACK command, and the transmission control method further comprises the following steps:

filling, by the processor, the NACK indication into the two consecutive slots in which a downlink data frame has not been successfully decoded by the processor; and filling, by the processor, the ACK indication into the two consecutive non-TG control slots which correspond to two non-TG data slots of the 15 non-TG data slots and in which the downlink data frame has successfully decoded by the processor;

filling, by the processor, the ACK indication into the two consecutive non-TG control slots which are without corresponding to two non-TG data slots of the 15 non-TG data slots and in which the downlink data frame has successfully decoded by the processor unless the previous two consecutive non-TG control slots are filled with the ACK indication;

filling, by the processor, the ACK indication into a last non-TG control slot of the remaining non-TG slot corresponding to a last non-TG data slot of the 15 non-TG data slots when the two consecutive non-TG control slots previous to the last non-TG control slot are filled with the ACK indications;

filling, by the processor, the NACK indication into a non-TG control slot of the remaining non-TG slot which is an odd-numbered slot and has no follow-up non-TG control slot and in which the downlink data frame has not been successfully decoded by the processor;

filling, by the processor, the ACK indication into a non-TG control slot of the remaining non-TG slot which is an odd-numbered slot and has no follow-up non-TG control slot and in which the downlink data frame has been successfully decoded by the processor;

filling, by the processor, the NACK indication into a non-TG control slot of the remaining non-TG slot which is an even-numbered slot and without a preceding non-TG control slot of the remaining non-TG slot and in which the downlink data frame has not been successfully decoded by the processor; and filling, by the processor, the ACK indication into a non-TG control slot of the remaining non-TG slot which is an even-numbered slot and without a preceding non-TG control slot of the remaining non-TG slot and in which the downlink data frame has been successfully decoded by the processor.

17. A base station comprising:
a transceiver, being configured to receive an uplink signal from a handheld device, wherein the uplink signal comprises an uplink dedicated physical data channel (UL DPDCH) and the handheld device uses only 15 non-transmission gap (non-TG) data slots within two radio frames to carry user data without using all non-TG data slots within the two radio frames of the UL DPDCH to carry the user data for reducing power consumption in the handheld device when the handheld device has successfully and early decoded a downlink data frame of downlink data received from the base station or when the base station only uses 15 non-TG data slots within the two radio frames of DL DPDCH to carry the downlink data; and
a processor, being electrically connected to the transceiver and configured to retrieve the user data from the 15 non-TG data slots.

18. The base station as claimed in claim 17, wherein the uplink signal further comprises an uplink dedicated physical control channel (UL DPCCH) having at least 15 non-TG control slots within the two radio frames, each of at least 15 non-TG control slots has a transport format combination indicator (TFCI) field, the TFCI fields of first 10 non-TG control slots of the at least 15 non-TG control slots carry a TFCI code word, and the TFCI fields of remaining non-TG control slots of the at least 15 non-TG control slots carry acknowledgement (ACK) information for downlink data frame early termination.

19. The base station as claimed in claim 18, wherein the TFCI code word is a truncated 20-bit TFCI code word from a 32-bit TFCI code word corresponding to a 10-bit TFCI information, and each of the TFCI field of the first 10 non-TG control slots carries 2 bits of the truncated 20-bit TFCI code.

20. The base station as claimed in claim 18, wherein the ACK information comprises a plurality of 2-bit indications, each of the 2-bit indication is carried in one of the remaining non-TG control slots, and each of the 2-bit indication is one of an acknowledgement (ACK) indication and a negative-acknowledgment (NACK) indication.

21. A transmission control method for use in a base station, the base station comprising a transceiver and a processor, the processor being electrically connected to the transceiver, the transmission control method comprising the following steps:
receiving, by the transceiver, an uplink signal transmitted from a handheld device, wherein the uplink signal comprises an uplink dedicated physical data channel (UL DPDCH), and the handheld device uses only 15 non-transmission gap (non-TG) data slots within two radio frames to carry user data without using all non-TG data slots within the two radio frames of the UL DPDCH to carry the user data for reducing power consumption in the handheld device when the handheld device has successfully and early decoded a downlink data frame of downlink data received from the base station or when the base station only uses 15 non-TG data slots within the two radio frames of DL DPDCH to carry the downlink data; and
retrieving, by the processor, the user data from the 15 non-TG data slots.

22. The transmission control method as claimed in claim 21, wherein the uplink signal further comprises an uplink dedicated physical control channel (UL DPCCH) having at least 15 non-TG control slots within the two radio frames, each of at least 15 non-TG control slots has a transport format combination indicator (TFCI) field, the TFCI fields of first 10 non-TG control slots of the at least 15 non-TG control slots carry a TFCI code word, and the TFCI fields of remaining non-TG control slots of the at least 15 non-TG control slots carry acknowledgement (ACK) information for downlink data frame early termination.

23. The transmission control method as claimed in claim 22, wherein the TFCI code word is a truncated 20-bit TFCI code word from a 32-bit TFCI code word corresponding to a 10-bit TFCI information, and each of the TFCI field of the first 10 non-TG control slots carries 2 bits of the truncated 20-bit TFCI code.

24. The transmission control method as claimed in claim 22, wherein the ACK information comprises a plurality of 2-bit indications, each of the 2-bit indication is carried in one of the remaining non-TG control slots, and each of the 2-bit indication is one of an acknowledgement (ACK) indication and a negative-acknowledgment (NACK) indication.

* * * * *